United States Patent
Ito et al.

(10) Patent No.: US 7,498,285 B2
(45) Date of Patent: Mar. 3, 2009

(54) NONREDUCING DIELECTRIC CERAMIC, AND MANUFACTURING METHOD AND MONOLITHIC CERAMIC CAPACITOR OF THE SAME

(75) Inventors: Toshiyuki Ito, Moriyama (JP); Harunobu Sano, Kyoto (JP)

(73) Assignee: Murata Manufacturing Co., Ltd., Nagaokakyo-shi (JP)

( * ) Notice: Subject to any disclaimer, the term of this patent is extended or adjusted under 35 U.S.C. 154(b) by 0 days.

(21) Appl. No.: 11/875,683

(22) Filed: Oct. 19, 2007

(65) Prior Publication Data

US 2008/0193776 A1    Aug. 14, 2008

Related U.S. Application Data

(63) Continuation of application No. 10/480,198, filed on Dec. 10, 2003, now abandoned.

(30) Foreign Application Priority Data

| Apr. 16, 2002 | (JP) | ............................ 2002-113185 |
| Feb. 14, 2003 | (JP) | ............................ 2003-036305 |
| Mar. 12, 2003 | (JP) | ............................ 2003-066446 |

(51) Int. Cl.
*C04B 35/47* (2006.01)
(52) U.S. Cl. ................... 501/136; 501/137; 501/138; 501/139
(58) Field of Classification Search ............... 501/134, 501/135, 136, 137, 138, 139
See application file for complete search history.

(56) References Cited

U.S. PATENT DOCUMENTS

| 6,118,648 A | 9/2000 | Kojima et al. ............... 361/311 |
| 6,329,311 B1 | 12/2001 | Fujii et al. .................. 501/136 |
| 6,396,681 B2 | 5/2002 | Naito et al. ............... 361/321.4 |
| 6,617,273 B2 | 9/2003 | Motoki et al. ............... 501/136 |
| 6,656,863 B2 | 12/2003 | Fukui et al. .................. 501/136 |
| 6,730,624 B2 | 5/2004 | Motoki et al. ............... 501/136 |
| 6,790,801 B2 | 9/2004 | Kim et al. ................... 501/136 |
| 6,858,554 B2 | 2/2005 | Moon et al. ................. 501/136 |
| 2005/0288173 A1 | 12/2005 | Umemotot et al. | |

FOREIGN PATENT DOCUMENTS

| EP | 0 446 814 A2 | 9/1991 |
| EP | 0 630 032 A1 | 12/1994 |
| EP | 0 722 176 A2 | 7/1996 |
| EP | 0 851 444 A2 | 7/1998 |
| EP | 1 346 965 A1 | 9/2003 |
| FR | 2 376 500 A1 | 7/1978 |
| FR | 2 807 425 A1 | 10/2001 |
| GB | 2 361 002 A | 10/2001 |
| JP | 55-21962 | 6/1980 |
| JP | 63-121209 | 5/1988 |
| JP | 63-224106 | 9/1988 |
| JP | 04-114919 | 4/1992 |
| JP | 04- 206109 | 7/1992 |
| JP | 05-286769 | 11/1993 |
| JP | 10-255549 | 9/1998 |
| JP | 11-134941 | 5/1999 |
| JP | 2000-053466 | 2/2000 |
| JP | 2000-264729 | 9/2000 |
| JP | 2001-172081 | 6/2001 |
| JP | 2001-351828 | 12/2001 |

*Primary Examiner*—Karl E Group
(74) *Attorney, Agent, or Firm*—Dickstein, Shapiro, LLP.

(57) ABSTRACT

A nonreducing dielectric ceramic comprising a (Sr, Ca)(Ti, Zr)$O_3$-based perovskite principal crystal phase containing 55 mole percent or more of $SrTiO_3$ and whose powder CuKα X-ray diffraction pattern exhibits a ratio of less than 5% of the maximum peak intensity of the accessory crystal phases being the other crystal phases to the intensity of the maximum peak of the perovskite crystal phase, which is present at $2\theta=25°$ to $35°$. This strontium titanate-based nonreducing dielectric ceramic has a high relative dielectric constant of 150 or more, a low third-order harmonic distortion ratio, and an excellent reliability in a high temperature-loading test. Accordingly, it is advantageously used for forming dielectric ceramic layers of a monolithic ceramic capacitor.

20 Claims, 6 Drawing Sheets

NONREDUCING DIELECTRIC CERAMIC, AND MANUFACTURING METHOD AND MONOLITHIC CERAMIC CAPACITOR OF THE SAME

This is a continuation of application Ser. No. 10/480,198, filed Dec. 10, 2003 now abandoned.

TECHNICAL FIELD

The present invention relates to a strontium titanate-based nonreducing dielectric ceramic, a method for manufacturing the same, and a monolithic ceramic capacitor using the nonreducing dielectric ceramic. In particular, the present invention is intended to increase the relative dielectric constant of the nonreducing dielectric ceramic and to thus enhance the reliability of the monolithic ceramic capacitor.

BACKGROUND ART

In general, dielectric ceramic materials are reduced to semiconductors by firing under a low oxygen partial pressure in, for example, a neutral or reducing atmosphere. Accordingly, internal electrodes of a monolithic ceramic capacitor comprising such a dielectric ceramic material have to be formed of a conductive material, such as palladium and platinum, that is not oxidized by firing under a high oxygen partial pressure nor is melted at the sintering temperature of the dielectric ceramic material. This makes it difficult to reduce the price and increase the capacitance of the monolithic ceramic capacitor.

The use of base metals, such as nickel and copper, for the internal electrode is expected to overcome the disadvantages. Unfortunately, these base metals used as a conductive material of the internal electrodes are undesirably oxidized by firing under a high oxygen partial pressure.

Accordingly, a dielectric ceramic material is required which is not changed to semiconductor by firing in a neutral or reducing atmosphere with a low oxygen partial pressure and which provides excellent dielectric characteristics if these base metals are used.

As nonreducing dielectric ceramics, particularly strontium titanate-based nonreducing dielectric ceramics, satisfying these requirements, compositions expressed by the formula $(Sr_{1-x}Ca_x)(Ti_{1-y}Zr_y)O_3$ have been proposed (for example, in Japanese Unexamined Patent Application Publication Nos. 2000-53466 and 63-224106).

Since these dielectric ceramic materials are not changed into semiconductors by firing in a reducing atmosphere, base metals, such as nickel and copper, can be used as a conductive material for the internal electrodes of monolithic ceramic capacitors.

In addition, another strontium titanate-based nonreducing dielectric ceramic has been proposed (in, for example, Japanese Unexamined Patent Application Publication No. 2001-351828) which is expressed by the formula (Ca, Sr, Ba, Mg) (Zn, Ti, Mn, Ni, Hf)$O_3$. This type of nonreducing dielectric ceramic advantageously exhibits small variations in characteristics and a high reliability.

Unfortunately, the relative dielectric constant of the strontium titanate-based nonreducing dielectric ceramic disclosed in Japanese Unexamined Patent Application Publication No. 2000-53466 is as low as less than 150.

As for the strontium titanate-based nonreducing dielectric ceramic disclosed in Japanese Unexamined Patent Application Publication No. 63-224106, if the thickness of dielectric ceramic layers formed of this ceramic between the internal electrodes is reduced to achieve a miniaturized high-capacitance monolithic ceramic capacitor, the reliability for high temperature-loading is disadvantageously reduced.

Also, the relative dielectric constant of the strontium titanate-based nonreducing dielectric ceramic disclosed in Japanese Unexamined Patent Application Publication No. 2001-351828 is disadvantageously as low as less than 100.

Accordingly, an object of the present invention is to provide a strontium titanate-based nonreducing dielectric ceramic exhibiting a high relative dielectric constant of 150 or more and a high reliability for high temperature loading, and a method for manufacturing the same.

Another object of the present invention is to provide a monolithic ceramic capacitor comprising the nonreducing dielectric ceramic.

DISCLOSURE OF INVENTION

To this end, according to a first aspect of the present invention, a nonreducing dielectric ceramic is provided which comprises a SrTiO$_3$-based perovskite principal crystal phase containing 55 mole percent or more of SrTiO$_3$ and accessory crystal phases including all the crystal phases other than the perovskite crystal phase. The powder CuKα X-ray diffraction pattern of the nonreducing dielectric ceramic has a ratio of less than 5% of the maximum peak intensity of the accessory crystal phases to that of the perovskite crystal phase at 2θ=25° to 35°.

According to a second aspect of the present invention, a nonreducing dielectric ceramic is provided which comprises a (Sr, Ca)(Ti, Zr)O$_3$-based perovskite principal crystal phase containing 55 mole percent or more of SrTiO$_3$ and accessory crystal phases including all the crystal phases other than the perovskite crystal phase. The powder CuKα X-ray diffraction pattern of the nonreducing dielectric ceramic has a ratio of less than 5% of the maximum peak intensity of the accessory crystal phases to that of the perovskite crystal phase at 2θ=25° to 35°.

The powder CuKα X-ray diffraction pattern was actual data without smoothing obtained from a measurement with an X-ray diffractometer (Model: RU-200PL) manufactured by Rigaku Industrial Corporation. The measurement was conducted with a radiation source of CuKα using a ½° divergent slit, a ½° scattering slit, a 0.15 mm receiving slit at a tube voltage of 40 kV and a tube current of 25 mA, with continuous scanning at a scanning speed of 4°/min, a scanning width of 0.02° C., and a scanning range of 20° to 60°.

In the present invention, the SrTiO$_3$-base perovskite crystal phase containing 55 mole percent or more of SrTiO$_3$ refers to a SrTiO$_3$ perovskite crystal phase expressed by the general formula ABO$_3$ in which the strontium content in the A site is 55 mole percent or more and the titanium content in B site is 55 mole percent or more. Also, the (Sr, Ca) (Ti, Zr)O$_3$-base perovskite crystal phase containing 55 mole percent or more of SrTiO$_3$ refers to a SrTiO$_3$ perovskite crystal phase expressed by the general formula ABO$_3$ in which the strontium content in the A site is 55 mole percent or more and the titanium content in B site is 55 mole percent or more.

Preferably, the invention according to the first and second aspects is advantageously applied to a nonreducing dielectric ceramic having the following composition.

Specifically, the principal constituents of the nonreducing dielectric ceramic, preferably, constitute a composition expressed by the formula $(Sr_{1-w-x}Ca_wBa_x)_m(Ti_{1-y-z}Zr_yHf_z)O_3$, where w, x, y, z, and m satisfy the expressions: $0 \leq w \leq 0.45$; $0 \leq x \leq 0.05$; $0 \leq w+x \leq 0.45$; $0 \leq y+z \leq 0.45$; and $0.95 < m < 1.05$. The accessory constituents contain at least one element selected from the group consisting of Mn, Ni, and Co, and the total content of these elements in terms of MnO, NiO, or CoO is in the range of 0.05 to 6.0 moles relative to 100 moles of the principal constituents.

In this instance, the nonreducing dielectric ceramic may further contain Re being at least one element selected from the group consisting of Dy, Ho, Er, Tm, Yb, Lu, Y, and Sc, as accessory constituents.

Alternatively, the nonreducing dielectric ceramic of the present invention may have the following composition.

Specifically, the principal constituents of the nonreducing dielectric ceramic, preferably constitute a composition expressed by the formula $(Sr_{1-w-x}Ca_wBa_x)_m(Ti_{1-y-z}Zr_yHf_z)O_3$, where w, x, y, z, and m satisfy the expressions: $0 \leq w \leq 0.45$; $0 \leq x \leq 0.05$; $0 \leq w+x \leq 0.45$; $0 \leq y+z \leq 0.45$; and $0.95 < m < 1.05$. The accessory constituents contain Re being at least one element selected from the group consisting of Dy, Ho, Er, Tm, Yb, Lu, Y, and Sc, and the total content of these elements is in the range of 0.05 to 5.0 moles relative to 100 moles of the principal constituent, in terms of $DyO_{3/2}$, $HoO_{3/2}$, $ErO_{3/2}$, $TmO_{3/2}$, $YbO_{3/2}$, $LuO_{3/2}$, $YO_{3/2}$, or $ScO_{3/2}$. The accessory constituents further contain at least one element selected from the group consisting of Mn, Ni, and Co, and the total content of these elements in terms of MnO, NiO, or CoO is in the range of 0.05 to 6.0 moles relative to 100 moles of the principal constituents.

Preferably, the nonreducing dielectric ceramic having any of the foregoing compositions further contains at least one of an aluminium compound and a magnesium compound as accessory constituents, and their total content is 6.0 moles or less in terms of $AlO_{3/2}$ or MgO relative to 100 moles of the principal constituents.

The nonreducing dielectric ceramic of the present invention may further contain a sintering agent containing at least one of Si and B. In this instance, preferably, the sintering agent content is 20 parts by weight or less to 100 parts by weight of all the constituents of the principal constituents and the accessory constituents.

The present invention is also directed to a method for manufacturing the nonreducing dielectric ceramic.

Specifically, the method includes: the step of preparing a plurality of starting materials containing elements constituting a composition expressed by $(Sr_{1-w-x}Ca_wBa_x)_m(Ti_{1-y-z}Zr_yHf_z)O_3$, where $0 \leq w \leq 0.45$, $0 \leq x \leq 0.05$, $0 \leq w+x \leq 0.45$, $0 \leq y+z \leq 0.45$, and $0.95 < m < 1.05$; the step of mixing the starting materials; the preliminary calcination step of calcining the mixture of the starting materials; the mixing and pulverization step of mixing and pulverizing the preliminarily calcined material; the main calcination step of fully calcining the preliminarily calcined material at a temperature higher than the temperature of the preliminary calcination so as to complete the reaction, after the mixing and pulverizing step; and the step of firing the material subjected to the main calcination to be sintered.

By performing the above-described two-step calcination (preliminary calcination step, main calcination step), a non-reducing dielectric ceramic containing 55 mole percent or more of $SrTiO_3$ and exhibiting a maximum peak intensity of less than 5% of accessory crystal phases being crystal phases other than the perovskite crystal phase can be produced while the accessory crystal phases are prevented from being produced.

The present invention is also directed to a monolithic ceramic capacitor.

The monolithic ceramic capacitor of the present invention includes a plurality of dielectric ceramic layers, and a plurality of internal electrodes containing a base metal as a conductive constituent. The internal electrodes lie along specific interfaces between the dielectric ceramic layers. External electrodes each electrically connected to some of the internal electrodes are also provided. The dielectric ceramic layers comprise the above-described nonreducing dielectric ceramic of the present invention.

The base metal contained in the internal electrodes may be nickel, a nickel alloy, copper, or a copper alloy.

The monolithic ceramic capacitor using the nonreducing dielectric ceramic of the present invention exhibits a high relative dielectric constant of 150 or more and a low third-order harmonic distortion. In addition, since the nonreducing dielectric ceramic provides excellent results in a high temperature-loading test, the thickness of the dielectric ceramic layers of the monolithic ceramic capacitor can be reduced to about 5 μm. This is advantageous for reducing the size and increasing the capacitance of monolithic ceramic capacitors.

Furthermore, inexpensive base metals, such as nickel and copper, can be used as the conductive material of the internal electrodes in monolithic ceramic capacitors without problems.

BEST MODE FOR CARRYING OUT THE INVENTION

Figure 1:
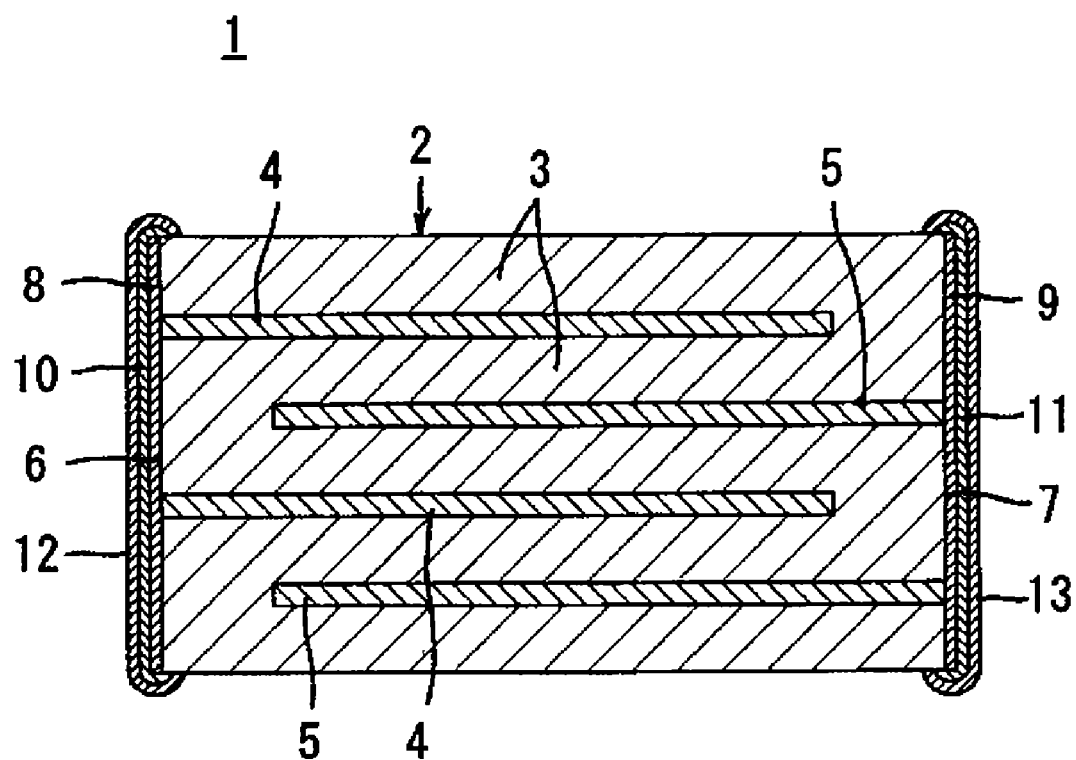
FIG. 1 is a schematic sectional view of a monolithic ceramic capacitor 1 according to an embodiment of the present invention.

FIG. 1 is a sectional view of a monolithic ceramic capacitor 1 according to an embodiment of the present invention.

The monolithic ceramic capacitor 1 includes a laminate 2. The laminate 2 includes a plurality of dielectric ceramic layers 3 and a plurality of internal electrodes 4 and 5 formed along specific interfaces between the dielectric ceramic layers 3.

The internal electrodes 4 and 5 extend to external surfaces of the laminate 2. Specifically, the internal electrodes 4 extending to one side surface 6 of the laminate 2 and the internal electrodes 5 extending to the other side surface 7 are alternately disposed in the laminate 2 so that two adjacent internal electrodes 4 and 5 separated by the dielectric ceramic layer 3 produce a capacitance.

The internal electrodes 4 and 5 contain a base metal, such as nickel, a nickel alloy, copper, or a copper alloy, as a conductive constituent.

In order to extract the capacitance, external electrodes 8 and 9 are respectively provided on the external side surfaces 6 and 7 of the laminate 2 to be electrically connected to either the internal electrodes 4 or 5. The conductive material of the external electrodes 8 and 9 may be the same as that of the internal electrodes 4 and 5, and besides, silver, palladium, a silver-palladium alloy, and the like may be used. The external electrodes 8 and 9 are formed by applying and burning a conductive paste containing a powder of these metals and a glass frit.

The external electrodes 8 and 9, if necessary, are respectively covered with first plating layers 10 and 11 formed of nickel, copper, or the like, and the first plating layers 10 and 11 are respectively covered with second plating layers 12 and 13 formed of solder, tin, or the like.

In this monolithic ceramic capacitor 1, the dielectric ceramic layers 3 are formed of a nonreducing dielectric ceramic of the present invention.

The nonreducing dielectric ceramic comprises a $SrTiO_3$-based or $(Sr, Ca)(Ti, Zr)O_3$-based perovskite principal crystal phase containing 55 mole percent or more of $SrTiO_3$ and accessory crystal phases including all the crystal phases other than the perovskite crystal phase, and the powder CuKα X-ray diffraction pattern of the ceramic exhibits a ratio of less than 5% of the maximum peak intensity of the accessory crystal phases to the intensity of the maximum peak of the perovskite crystal phase which is present at $2\theta=25°$ to $35°$.

If the principal crystal phase of a ceramic is of perovskite expressed by the general formula $ABO_3$ in which the A site contains 55 mole percent or more of strontium and the B site contains 55 mole percent or more of titanium, and in which the A site comprises calcium and 55 mole percent or more of strontium, and the B site comprises zirconium and 55 mole percent or more of titanium, the ceramic has a low Curie temperature of $-60°$ C. or less and does not exhibit ferroelectricity at room temperature. Therefore, the nonreducing dielectric ceramic can exhibit a low dielectric loss, a low third-order harmonic distortion rate, and a relative dielectric constant of 150 or more. In addition, if the maximum peak intensity ratio of the accessory crystal phases is less than 5%, the lifetime in a high temperature-loading test becomes relatively long and, thus, a high reliability can be achieved.

The nonreducing dielectric ceramic may further contain barium in the A site and hafnium in the B site. Specifically, the nonreducing dielectric ceramic typically contains principal constituents forming a composition expressed by the formula $(Sr_{1-w-x}Ca_wBa_x)_m(Ti_{1-y-z}Zr_yHf_z)O_3$.

Preferably, w satisfies the relationship $0 \leq w \leq 0.45$. This is because a w value of more than 0.45 leads to a low relative dielectric constant.

Preferably, x satisfies the relationship $0 \leq x \leq 0.05$. This is because an x value of more than 0.05 leads to a high relative dielectric constant, but undesirably increases the dielectric loss and the third-order harmonic distortion rate. Besides, it causes accessory crystal phases to be produced to reduce the specific resistance and reliability.

Even if w and x satisfy the foregoing requirements, a w+x value of more than 0.45 leads to a low relative dielectric constant. Accordingly, it is preferable that w+x satisfy the relationship $0 \leq w+x \leq 0.45$.

Preferably, y+z satisfies the relationship $0 \leq y+z \leq 0.45$. This is because a y+z value of more than 0.45 leads to a low relative dielectric constant.

Preferably, m satisfies the relationship $0.95 < m < 1.05$. An m value of 0.95 or less causes accessory crystal phases to be produced to increase the dielectric loss and reduces the lifetime in a high temperature-loading test. On the other hand, an m value of 1.05 or more not only causes accessory phases to be produced, but also extremely degrades the sintering characteristics of the ceramic. Accordingly, it is preferable that m satisfy the relationship $0.95 < m < 1.05$.

Preferably, the nonreducing dielectric ceramic containing the above-described principal constituents contains at least one element selected from among Mn, Ni, and Co as accessory constituents. This is because at least one element of Mn, Co and Ni has the effects of increasing the sintering characteristics, specific resistance, and mean lifetime of the ceramic.

However, if the total content of these element in terms of MnO, NiO, or CoO is less than 0.05 mole relative to 100 moles of the principal constituents, the above-described effects are not sufficiently achieved and, accordingly, the sintering characteristics are negatively affected to produce accessory crystal phases. Consequently, the dielectric loss is increased; the specific resistance is reduced; and the lifetime in a high temperature-loading test is extremely reduced. On the other hand, a total content of more than 6.0 moles increases the maximum peak intensity ratio of the accessory crystal phases to reduce the specific resistance and the lifetime in a high temperature-loading test. Accordingly, it is preferable that the total content of Mn, Ni, and Co, being accessory constituents, be in the range of 0.05 to 6.0 moles relative to 100 moles of the principal constituents.

Preferably, the nonreducing dielectric ceramic further contains Re (at least one element selected from the group consisting of Dy, Ho, Er, Tm, Yb, Lu, Y, and Sc) as accessory constituents. Re, acting as accessory constituents, enhances the stability of the ceramic in a sintering atmosphere, so that a base metal, such as nickel or copper, can be used as the conductive material of the internal electrodes 4 and 5 of the monolithic ceramic capacitor 1 without problems.

Preferably, the total content of the accessory constituent Re is in the range of 0.05 to 5.0 moles relative to 100 moles of the principal constituents, in terms of $DyO_{3/2}$, $HoO_{3/2}$, $ErO_{3/2}$, $TmO_{3/2}$, $YbO_{3/2}$, $LuO_{3/2}$, $YO_{3/2}$, or $ScO_{3/2}$.

A Re content of more than 5.0 moles reduces the specific resistance, and a Re content of less than 0.05 mole does not sufficiently produce the effect of Re.

Preferably, the nonreducing dielectric ceramic further contains at least one of an aluminum compound and a magnesium compound as accessory constituents, and their total content in terms of $AlO_{3/2}$ or MgO is 6.0 moles or less relative to 100 moles of the principal constituents.

By adding an aluminum compound and a magnesium compound as accessory constituents, the specific resistance and relative dielectric constant are increased; the third-order harmonic distortion rate is reduced; and the lifetime in a high temperature-loading test is increased, in comparison with a ceramic not containing these compounds. Preferably, the content of the aluminum and magnesium compounds is 6.0 moles or less because a content of more than 6.0 moles produces accessory crystal phases and reduces the lifetime in a high temperature-loading test.

Preferably, the nonreducing dielectric ceramic further contains a sintering agent containing at least one of Si and B. The sintering agent helps the sintering temperature of the nonreducing dielectric ceramic decrease, accordingly reducing the cost for a firing step for obtaining laminate 2 of the monolithic ceramic capacitor 1.

Preferably, the sintering agent content is 20 parts by weight or less to 100 parts by weight of all the constituents of the principal constituents and the accessory constituents. This is because a sintering agent content of more than 20 parts by weight further increases the maximum peak intensity ratio of the accessory crystal phases and reduces the lifetime in a high temperature-loading test.

The nonreducing dielectric ceramic of the present invention constituting the dielectric ceramic layers 3 of the monolithic ceramic capacitor 1 is resultantly obtained through the process for manufacturing the monolithic ceramic capacitor 1.

In manufacture of the monolithic ceramic capacitor 1, first, ceramic green sheets, which constitute the dielectric layers 3, are prepared. For the ceramic green sheets, an organic binder, an organic solvent, and necessary additives are added to a calcined powder prepared by calcining a plurality of starting powder materials to form a slurry, and the slurry is formed into sheets. A process for preparing the calcined powder contained in the ceramic green sheets will be described later.

After the formation of the ceramic green sheets, a conductive paste film, which will serve as the internal electrode 4 or 5, is formed on each of the main surfaces of some of the ceramic green sheets. Then, a necessary number of the ceramic green sheets with the conductive paste film are layered, and the ceramic green sheets with no conductive paste film are laid on the top and bottom of the layered ceramic green sheets. The layered ceramic green sheets are pressed to obtain a laminate 2 in a raw state.

The laminate 2 in a raw state is cut into pieces, as required, and fired to be sintered in a reducing atmosphere at a predetermined temperature. The foregoing calcined powder is sintered in this stage, thereby forming the dielectric ceramic layers 3 comprising the nonreducing dielectric ceramic of the present invention.

Then, the external electrodes 8 and 9 are formed on the respective side surfaces 6 and 7 of the laminate 2. The external electrodes 8 and 9 are, if necessary, covered with the first plating layers 10 and 11 and the second plating layers 12 and 13 to complete the monolithic ceramic capacitor 1.

The calcined powder contained in the ceramic green sheets is, preferably, prepared as follows.

First, a plurality of raw powder materials which contain the elements constituting the composition expressed by the formula $(Sr_{1-w-x}Ca_wBa_x)_m(Ti_{1-y-z}Zr_yHf_z)O_3$, where $0 \leq w \leq 0.45$, $0 \leq x \leq 0.05$, $0 \leq w+x \leq 0.45$, $0 \leq y+z \leq 0.45$, and $0.95 < m < 1.05$ are prepared and mixed.

The mixture of the starting powder materials is calcined in a preliminary calcination step (first calcination step). The preliminary calcination is performed, for example, at a temperature in the range of 500 to 1000° C. for 2 hours in the air.

The preliminarily calcined material is mixed and pulverized in a mixing and pulverization step. By performing the mixing and pulverization step, the dispersibility of the preliminarily calcined material is increased.

Then, the preliminarily calcined material is fully calcined to complete the reaction at a temperature higher than the temperature of the preliminary calcination in a main calcination step (second calcination step). The main calcination is performed, for example, at a temperature in the range of 800 to 1200° C. for 2 hours in the air. The resulting material subjected to the main calcination is used as the foregoing calcined powder contained in the ceramic green sheets.

By calcining the mixture of the starting powder materials in two steps as above, the uniformity of the composition is enhanced and the occurrence of heterogeneous phases is prevented. As a result, the ratio of the maximum peak intensity of the accessory crystal phases to that of the perovskite crystal phase at $2\theta = 25°$ to $35°$ can be less than 5% in the CuKα X-ray diffraction pattern.

The above-described accessory constituents may be added at the stage of mixing the starting powder materials, after the preliminary calcination step, or after the main calcination step.

The starting powder materials for the principal constituents and accessory constituents and the sintering agent may be in any form, and, for example, in a form of oxide, carbonate, hydroxide, or organometallic compounds.

The present invention will be further described in detail with reference to experimental examples.

The following experimental examples were intended to establish grounds for the scope of, or preferred scopes of, the present invention and to confirm the effects of the invention.

EXPERIMENTAL EXAMPLE 1

First, prepared were $SrCO_3$, $CaCO_3$, $BaCO_3$, $ZrO_2$, $TiO_2$ and $HfO_2$ powders with purities of 99% or more as the starting powder materials for the principal constituents. Also, $MnCO_3$, $CoCO_3$, and NiO powders were prepared as the starting powder materials for the accessory constituents.

Then, the starting power materials for the principal constituents were weighed out so as to constitute the composition expressed by the formula $$(Sr_{1-w-x}Ca_wBa_x)_m(Ti_{1-y-z}Zr_yHf_z)O_3,$$

according to the molar ratios shown in Table 1 represented by w, x, y, z, and m. The starting powder materials for the accessory constituents were weighed out so that their mole numbers in terms of MnO, NiO, or CoO became the values shown in Table 1 relative to 100 moles of the principal constituents.

The weighed starting powder materials for the principal constituents and the accessory constituents were wet-mixed in a ball mill with zirconia balls to prepare an uncalcined powder mixture.

TABLE 1

| Sample number | $(Sr_{1-w-x}Ca_wBa_x)_m(Ti_{1-y-z}Zr_yHf_z)O_3$ | | | | | Accessory constituent | Accessory constituent content (mol) |
|---|---|---|---|---|---|---|---|
| | w | x | y | z | m | | |
| 1 | 0.00 | 0.00 | 0.00 | 0.00 | 1.00 | Mn | 2.0 |
| 2 | 0.00 | 0.00 | 0.00 | 0.00 | 0.98 | Mn | 0.5 |
| 3 | 0.00 | 0.00 | 0.00 | 0.01 | 1.03 | Mn | 1.5 |
| 4 | 0.00 | 0.00 | 0.00 | 0.00 | 0.99 | Mn | 3.0 |
| 5 | 0.00 | 0.00 | 0.00 | 0.00 | 1.00 | Co | 3.0 |
| 6 | 0.00 | 0.00 | 0.00 | 0.00 | 0.98 | Ni | 1.0 |
| 7 | 0.35 | 0.00 | 0.00 | 0.00 | 1.00 | Mn | 3.5 |
| 8 | 0.40 | 0.00 | 0.00 | 0.00 | 0.99 | Mn | 3.0 |
| 9 | 0.45 | 0.00 | 0.00 | 0.00 | 1.01 | Ni | 3.0 |
| 10 | 0.40 | 0.01 | 0.00 | 0.02 | 0.98 | Co | 4.5 |
| 11 | 0.20 | 0.00 | 0.20 | 0.01 | 1.00 | Mn | 3.0 |
| 12 | 0.10 | 0.03 | 0.20 | 0.00 | 0.98 | Mn | 5.0 |
| 13 | 0.00 | 0.01 | 0.35 | 0.05 | 1.02 | Mn | 4.0 |
| 14 | 0.40 | 0.00 | 0.40 | 0.00 | 0.98 | Mn | 3.5 |
| 15 | 0.20 | 0.05 | 0.10 | 0.00 | 1.01 | Ni | 1.5 |
| *16 | 0.20 | 0.00 | 0.20 | 0.01 | 1.00 | Mn | 3.0 |
| *17 | 0.20 | 0.00 | 0.20 | 0.01 | 1.00 | Mn | 3.0 |
| *18 | 0.70 | 0.00 | 0.20 | 0.00 | 0.99 | Mn | 2.0 |
| *19 | 0.70 | 0.00 | 0.50 | 0.01 | 1.01 | Mn | 2.0 |
| *20 | 0.40 | 0.00 | 0.70 | 0.03 | 0.99 | Mn | 3.0 |
| *21 | 0.00 | 0.80 | 0.00 | 0.00 | 1.00 | Mn | 1.0 |
| *22 | 0.50 | 0.25 | 0.10 | 0.00 | 1.00 | Mn | 1.0 |
| *23 | 0.20 | 0.00 | 0.20 | 0.00 | 0.90 | Mn | 1.5 |
| *24 | 0.20 | 0.00 | 0.20 | 0.01 | 1.08 | Mn | 2.0 |
| *25 | 0.10 | 0.00 | 0.20 | 0.01 | 1.04 | — | — |
| *26 | 0.20 | 0.00 | 0.20 | 0.01 | 1.01 | Mn | 8.0 |
| *27 | 0.50 | 0.00 | 0.50 | 0.00 | 1.01 | Mn | 0.5 |

The samples marked with an asterisk * in Table 1 are outside the scope of the invention, and are also marked as well in Tables 2 and 3.

The uncalcined powder mixture was preliminarily calcined at 750° C. for 2 hours in the air to prepare a preliminarily calcined material.

The preliminarily calcined material was mixed and pulverized in a wet ball mill. The mean particle size of the mixed and pulverized material was as small as 0.05 to 0.2 μm, and the presence of unreacted carbonates of the raw materials was observed by X-ray diffraction.

The mixed and pulverized preliminarily calcined material was subjected to main calcination at 1100° C. for 2 hours in the air. The resulting fully calcined material was pulverized to yield a fully calcined powder.

Sample 16 shown in Table 1, which is of a comparative example, has the same composition as sample 11, but was subjected to only main calcination at 1100° C. for 2 hours in the air without the preliminary calcination.

Sample 17 shown in Table 1, which is also of a comparative example, was obtained only by mixing previously prepared $SrTiO_3$ and $CaZrO_3$ powders weighed out so that the molar ratio became 8:2.

Each fully calcined powder sample thus obtained was measured for particle size with a scanning electron microscope (SEM) to determine the mean particle size, and was subjected to powder X-ray diffraction analysis using CuKα radiation (tube voltage: 40 kV, tube current: 25 mA). The crystal system of the perovskite crystal phase was identified and the ratio of the maximum peak intensity of the accessory crystal phases, including all the other crystal phases, to that of the principal crystal phase at 2θ=25° to 35° was determined from the obtained X-ray diffraction (XRD) pattern. The obtained particle size, accessory crystal phases XRD maximum peak intensity ratio, and crystal system type of the fully calcined powder are shown in Table 2.

formed into sheets by a doctor blade technique, thus resulting in rectangular ceramic green sheets with a thickness of about 7 μm.

The ceramic green sheets were layered one on top of another to form a ceramic green sheet laminate. This laminate was pressed in the layered direction and, then, cut out to a rectangular form with a predetermined size.

The ceramic green sheet laminate cut out was heated at 350° C. to burn the binder, and was, subsequently, fired at a firing temperature shown in Table 2 in a reducing atmosphere of $H_2$—$N_2$—$H_2O$ gas to yield a ceramic compact.

Then, the ceramic compact was pulverized in a mortar and subjected to powder X-ray diffraction with CuKα radiation (tube voltage: 40 kV, tube current: 25 mA). The crystal system of the perovskite crystal phase, being the principal crystal phase, was identified, and the ratio of the maximum peak intensity of the accessory crystal phases, including all the other crystal phases, to that of the principal crystal phase at 2θ=25° to 35° was determined, form the obtained X-ray diffraction pattern. The obtained crystal system type of the compact, and accessory crystal phases XRD peak intensity ratio of the compact are shown in Table 2.

Meanwhile, monolithic ceramic capacitor samples were prepared as follows.

First, a conductive paste essentially containing copper was printed on the same ceramic green sheets as in preparation of the ceramic compact to form conductive paste films constituting the internal electrodes.

TABLE 2

| Sample number | Fully calcined powder particle size (μm) | Accessory crystal phases XRD peak intensity ratio of fully calcined powder (%) | Crystal system of fully calcined powder | Firing temperature (° C.) | Accessory crystal phases XRD peak intensity ratio of compact (%) | Crystal system of compact |
|---|---|---|---|---|---|---|
| 1 | 0.2 | <1 | Cubic | 1000 | <1 | Cubic |
| 2 | 0.3 | <1 | Cubic | 1000 | <1 | Cubic |
| 3 | 0.2 | <1 | Cubic | 1000 | 1 | Cubic |
| 4 | 0.2 | <1 | Cubic | 1000 | <1 | Cubic |
| 5 | 0.2 | <1 | Cubic | 1000 | <1 | Cubic |
| 6 | 0.3 | <1 | Cubic | 1000 | 1 | Cubic |
| 7 | 0.5 | <1 | Cubic | 980 | <1 | Cubic |
| 8 | 0.5 | 1 | Cubic | 980 | <1 | Cubic |
| 9 | 0.4 | <1 | Cubic | 980 | <1 | Cubic |
| 10 | 0.5 | <1 | Cubic | 1030 | 2 | Cubic |
| 11 | 0.2 | 2 | Cubic | 1030 | 1 | Cubic |
| 12 | 0.2 | 2 | Cubic | 1030 | 2 | Cubic |
| 13 | 0.2 | 1 | Cubic | 1030 | <1 | Cubic |
| 14 | 0.3 | 1 | Cubic | 1030 | <1 | Cubic |
| 15 | 0.3 | <1 | Cubic | 1000 | <1 | Cubic |
| *16 | 0.2 | 10 | Cubic | 1030 | 6 | Cubic |
| *17 | 0.2 | Uncalcined | Cubic | 1030 | 14 | Cubic |
| *18 | 0.6 | 1 | Rhombic | 1000 | <1 | Rhombic |
| *19 | 0.5 | 2 | Rhombic | 1030 | <1 | Rhombic |
| *20 | 0.3 | 2 | Rhombic | 1030 | <1 | Rhombic |
| *21 | 0.4 | <1 | Tetragonal | 1000 | <1 | Tetragonal |
| *22 | 0.3 | 30 | Cubic | 1000 | 57 | Cubic |
| *23 | 0.6 | 8 | Cubic | 1030 | 7 | Cubic |
| *24 | 0.1 | 9 | Cubic | 1030 | 6 | Cubic |
| *25 | 0.1 | 5 | Cubic | 1030 | 7 | Cubic |
| *26 | 0.2 | 7 | Cubic | 1030 | 7 | Cubic |
| *27 | 0.2 | 9 | Cubic | 1030 | 9 | Cubic |

To the fully calcined powder were added 1.5 parts by weight of a glass containing $B_2O_3$, acting as a sintering agent, relative to 100 parts by weight of all the principal and accessory constituents, a polyvinyl butyral binder, and an organic solvent, such as ethanol. These materials were wet-mixed in a ball mill to prepare a slurry. The resulting ceramic slurry was A plurality of the ceramic green sheets each having the conductive paste film were layered so as to alternately arrange the sides of the respective sheets to which the conductive films extend, and ceramic green sheets with no conductive paste were disposed on the top and the bottom of the layered ceramic green sheets. The resulting composite was pressed in the layered direction, and then cut out to a predetermined size to obtain a green laminate.

Then, a conductive paste essentially containing copper was applied on both sides of the green laminate to form external electrodes connected to the internal electrodes.

The green laminate was heated to 350° C. in an atmosphere of nitrogen to decompose the binder, and was, subsequently, fired at the firing temperature shown in Table 2 in a reducing atmosphere of $H_2$—$N_2$—$H_2O$ gas to yield a monolithic ceramic capacitor.

The outside dimensions of the resulting monolithic ceramic capacitor were 3.2 mm in width by 4.5 mm in length by 1.2 mm in thickness, and the dielectric ceramic layer measured 5 μm in thickness. The number of effective dielectric ceramic layers was five.

The electrical properties and reliability of each sample of the monolithic ceramic capacitor were evaluated. Table 3 shows the results.

The relative dielectric constant shown in Table 3 was derived from the capacitance of the monolithic ceramic capacitor obtained from a measurement at a frequency of 1 kHz, 1 $V_{rms}$, and a temperature of 25° C.

The dielectric loss was obtained under the same conditions as in the measurement of the capacitance.

For log ρ, after the measurement of the capacitance, the insulation resistance was measured with a voltage of 100 V applied for 2 minutes at a temperature of 25° C., and the specific resistance was calculated from the obtained insulation resistance.

TC, which represents the change in capacitance with temperature, was derived from the following expression using capacitances measured at temperatures of 20° C. and 85° C. at a frequency of 1 kHz and 1 $V_{rms}$.

$$TC(\%) = \{(C_{85} - C_{20})/C_{20}\} \times 10^2$$

where $C_{85}$ and $C_{20}$ in the expression represent capacitances measured at 85° C. and 20° C., respectively.

The third-order harmonic distortion rate of each monolithic ceramic capacitor was measured according to the method for measuring the nonlinearity of fixed resistors, specified in the standard RC 2111 of Electronic Industries Association of Japan (EIAJ). The third-order harmonic distortion rates were measured with respective alternating voltages of 50 V/mm and 200 V/mm applied at 10 kHz, using a meter CLT-1 manufactured by RE TECHNOLOGY AS.

For the mean lifetime, a high-temperature loading test was conducted in which a direct voltage of 20 kV/mm was applied at 150° C. while changes in insulation resistance with time were being measured. The time required for the insulation resistance to decrease to $10^6 \Omega$ or less was defined as lifetime, and obtained lifetimes were averaged.

TABLE 3

| Sample number | Relative dielectric constant | Dielectric loss (%) | TC (%) | log ρ (Ω·cm) | Mean lifetime (hour) | Third-order harmonic distortion rate (dB) 50 V/mm | Third-order harmonic distortion rate (dB) 200 V/mm |
|---|---|---|---|---|---|---|---|
| 1 | 296 | 0.02 | −17.9 | 13.4 | >100 | −119 | −108 |
| 2 | 302 | 0.02 | −18.2 | 13.3 | 81 | −118 | −105 |
| 3 | 289 | 0.02 | −17.5 | 13.5 | >100 | −122 | −108 |
| 4 | 296 | 0.02 | −17.7 | 13.3 | >100 | −120 | −104 |
| 5 | 292 | 0.01 | −17.8 | 13.2 | >100 | −122 | −107 |
| 6 | 293 | 0.02 | −17.7 | 13.5 | >100 | −119 | −109 |
| 7 | 225 | 0.02 | −6.0 | 13.3 | >100 | −121 | −110 |
| 8 | 228 | 0.02 | −6.2 | 13.2 | >100 | −123 | −111 |
| 9 | 229 | 0.02 | −6.3 | 13.3 | >100 | −123 | −110 |
| 10 | 225 | 0.03 | −6.1 | 13.0 | >100 | −121 | −108 |
| 11 | 201 | 0.01 | −9.8 | 13.4 | >100 | −125 | −113 |
| 12 | 203 | 0.01 | −9.6 | 13.3 | 88 | −115 | −102 |
| 13 | 181 | 0.01 | −9.9 | 13.6 | 97 | <−130 | −112 |
| 14 | 157 | 0.01 | −7.1 | 13.8 | >100 | <−130 | −115 |
| 15 | 241 | 0.02 | −12.0 | 13.2 | >100 | −121 | −108 |
| *16 | 198 | 0.01 | −9.7 | 13.4 | 33 | −114 | −103 |
| *17 | 202 | 0.01 | −9.5 | 13.1 | 18 | −117 | −105 |
| *18 | 130 | 0.01 | −9.1 | 13.3 | >100 | −121 | −109 |
| *19 | 118 | 0.01 | −8.3 | 13.5 | >100 | <−130 | −113 |
| *20 | 82 | 0.01 | −6.7 | 14.2 | >100 | <−130 | −115 |
| *21 | 554 | 1.03 | −5.0 | 12.3 | 1 | −74 | −52 |
| *22 | 309 | 0.15 | −17.5 | 12.2 | 2 | −89 | −84 |
| *23 | 195 | 0.10 | −9.7 | 12.8 | 21 | −118 | −107 |
| *24 | 199 | 0.09 | −9.7 | 13.0 | 8 | −118 | −103 |
| *25 | 186 | 0.58 | −9.7 | 11.5 | <1 | −99 | −87 |
| *26 | 197 | 0.15 | −9.6 | 12.7 | 39 | −110 | −101 |
| *27 | 114 | 0.02 | −8.3 | 13.3 | 30 | −120 | −102 |

The nonreducing dielectric ceramic of the present invention comprises a $SrTiO_3$-based or $(Sr, Ca)(Ti, Zr)O_3$-based perovskite primary crystal phase containing 55 mole percent or more of $SrTiO_3$. As shown in Table 2, sintered samples 1 to 15 within the scope of the invention were identified as cubic crystals by the powder X-ray diffraction of the sintered samples, and whose powder CuKα X-ray diffraction patterns exhibit a ratio of less than 5% of the maximum peak intensity of the accessory crystal phases to the intensity of the maximum peak of the perovskite crystal phase which is present at 2θ=25° to 35°.

The monolithic ceramic capacitors produced from samples 1 to 15 each exhibit a high relative dielectric constant of 150 or more and a low dielectric loss of 0.05% or less, as shown in Table 3. In addition, their specific resistances are as high as $10^{13}$ Ω·cm or more, and their third-order harmonic distortion rates are as low as −110 dB or less at 50 V/mm and −100 dB or less at 200 V/mm. Furthermore, the mean lifetimes are as long as 50 hours or more.

The reasons will now be explained why the $SrTiO_3$ content in the principal crystal phase of the nonreducing dielectric ceramic of the present invention is controlled and why the ratio of the maximum peak intensity of the accessory crystal phases to that of the perovskite crystal phase at 2θ=25° to 35° (hereinafter referred to as accessory crystal phases XRD peak intensity ratio in some cases) is set at less than 5%.

Samples 18, 19, 20, and 27, whose $SrTiO_3$ content in the principal crystal phase is less than 55 mole percent, exhibit a low relative dielectric constant of 130 or less. Sample 21, whose $SrTiO_3$ content in the principal crystal phase is also less than 55 mole percent, has ferroelectricity at room temperature, accordingly exhibiting a high dielectric loss of about 1% and a high third-order harmonic distortion rate.

In contrast, samples 1 to 15, whose $SrTiO_3$ content in the principal crystal phase is 55 mole percent or more, have a low Curie temperature of −60° C. or less and no ferroelectricity at room temperature, accordingly exhibiting a dielectric loss of 0.05% or less, a low third-order harmonic distortion rate, and a relative dielectric constant of 150 or more.

Also, an accessory crystal phases XRD peak intensity ratio of 5% or more reduces the mean lifetime, as in samples 16, 17, 22, 23, 24, 25, 26, and 27. Thus, an accessory crystal phases XRD peak intensity ratio of 5% or more negatively affects the characteristics in a short time.

In contrast, an accessory crystal phases XRD peak intensity ratio of less than 5% leads to a long mean lifetime, as shown in samples 1 to 15, thus resulting in a highly reliable ceramic material. It is therefore preferable that the accessory crystal phases XRD peak intensity ratio be less than 5%.

Figure 2:
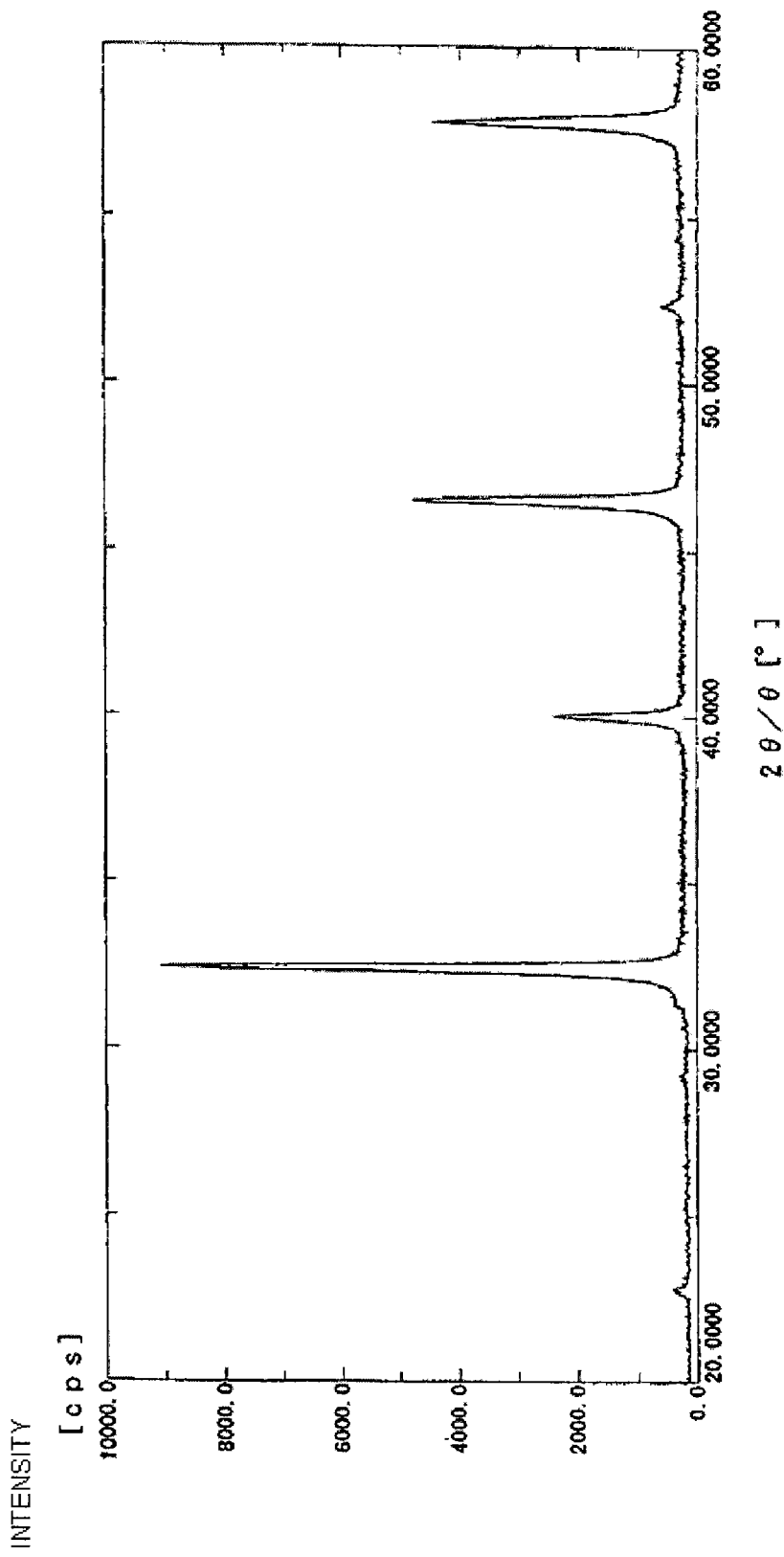
FIG. 2 is a powder X-ray diffraction pattern of a fully calcined powder of Sample 8 according to the present invention.
Figure 3:
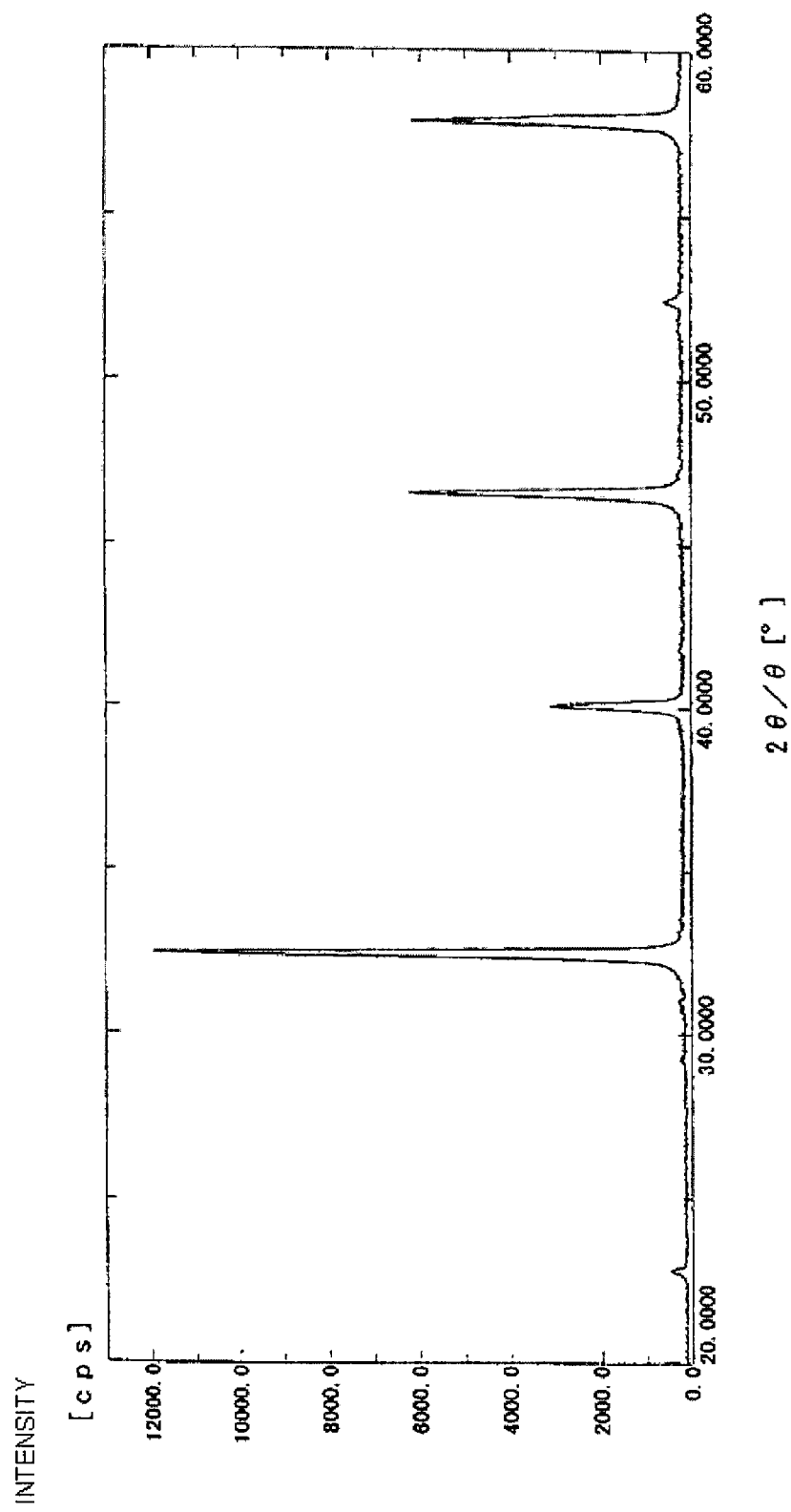
FIG. 3 is a powder X-ray diffraction pattern of a sintered compact of Sample 8 according to the present invention.
Figure 4:
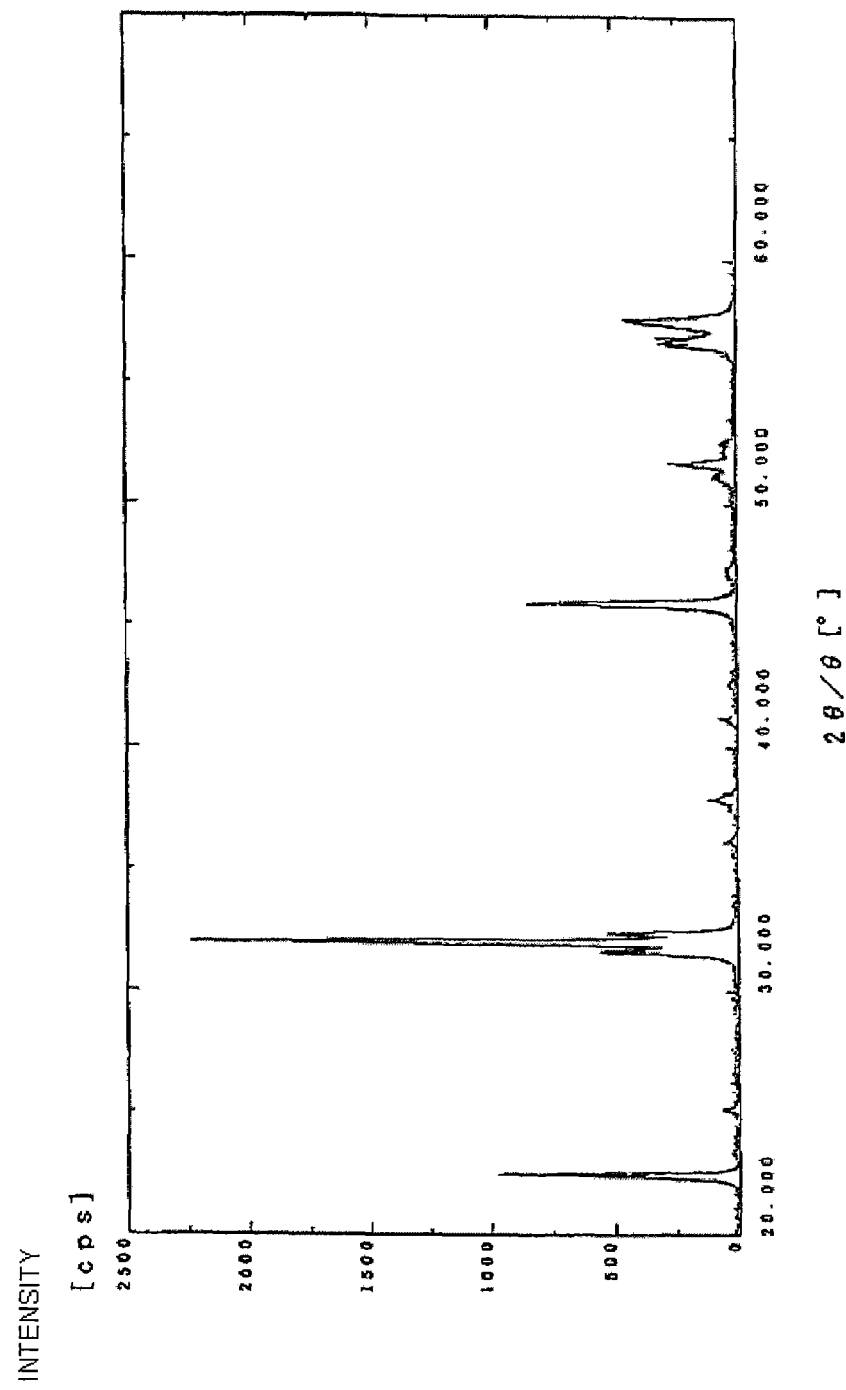
FIG. 4 is a powder X-ray diffraction pattern of a sintered compact of Sample 20 outside the scope of the present invention.
Figure 5:
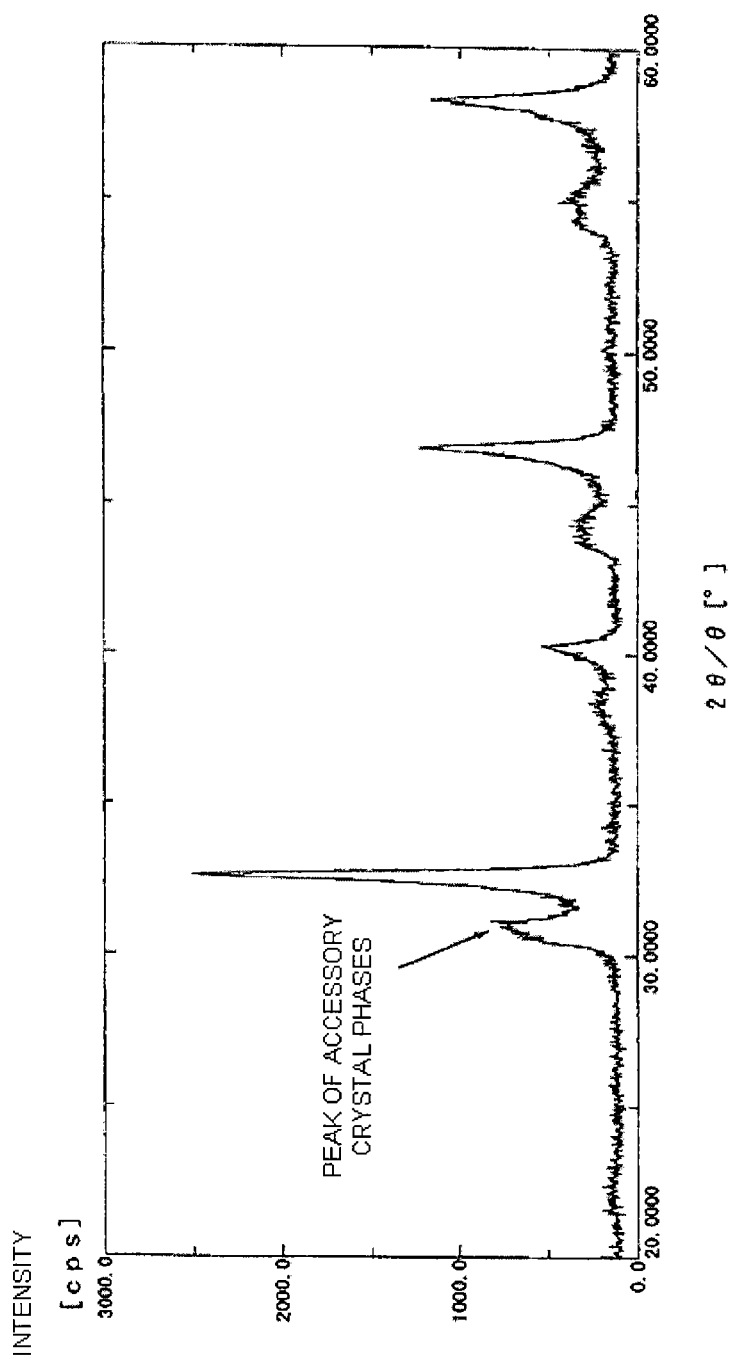
FIG. 5 is a powder X-ray diffraction pattern of a fully calcined powder of Sample 22 outside the scope of the present invention.
Figure 6:
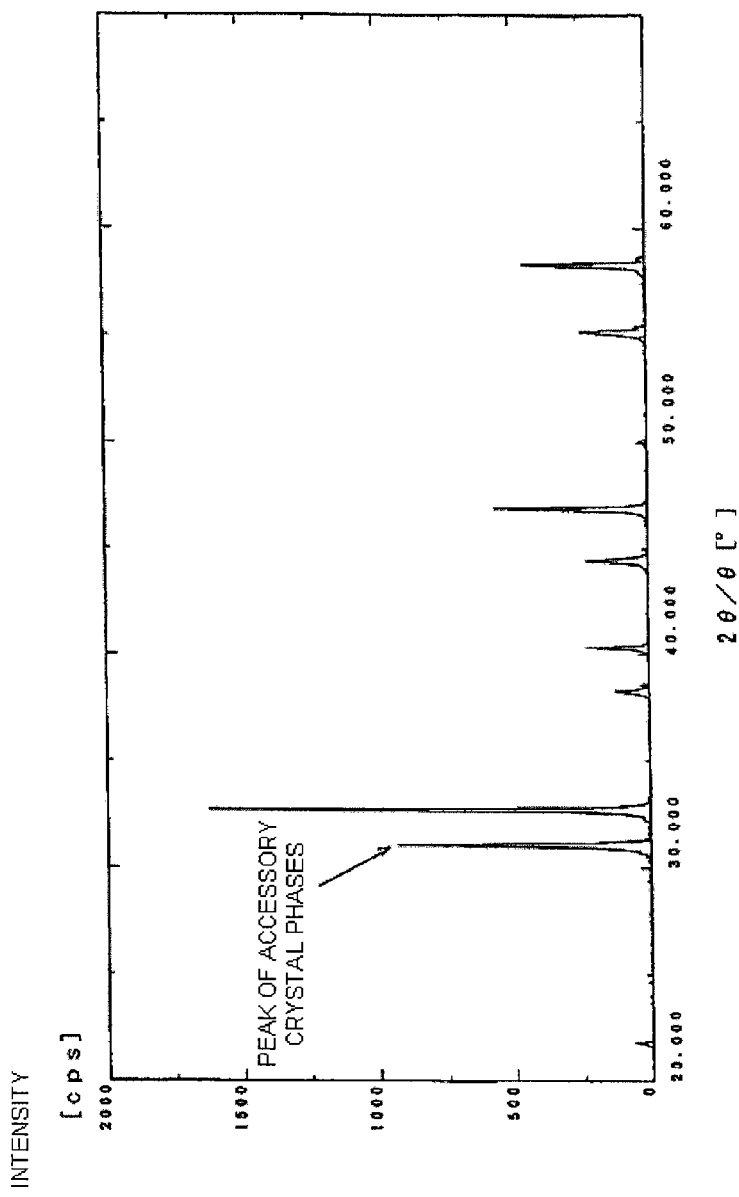
FIG. 6 is a powder X-ray diffraction pattern of a sintered compact of Sample 22 outside the scope of the present invention.

FIGS. 2 and 3 respectively show the X-ray diffraction patterns of the fully calcined powder ($SrTiO_3$ content in the principal crystal phase: 55 mol % or more, accessory crystal phases XRD peak intensity ratio: less than 1%) and the sintered compact ($SrTiO_3$ content in the principal constituents: 55 mol % or more, accessory crystal phases XRD peak intensity ratio: less than 1%) of sample 8 within the scope of the present invention. FIG. 4 shows an X-ray diffraction pattern of the sintered compact ($SrTiO_3$ content in the principal constituents: less than 55 mol %) of sample 20 outside the scope of the present invention. FIGS. 5 and 6 respectively show X-ray diffraction patterns of the fully calcined powder (accessory crystal phases XRD peak intensity ratio: 30%) and the sintered compact (accessory crystal phases XRD peak intensity ratio: 57%) of sample 22 outside the scope of the present invention.

The fully calcined powder samples whose powder x-ray diffraction pattern shows an accessory crystal phases XRD peak intensity ratio of less than 5% result in sintered compacts exhibiting an accessory crystal phases XRD peak intensity ratio of less than 5%. Hence, it is preferable that the proportion of the accessory crystal phases in a calcined powder be low.

The following examines preferred proportions of the composition of the strontium titanate-based nonreducing dielectric ceramic, that is, the composition expressed by the formula $(Sr_{1-w-x}Ca_wBa_x)_m(Ti_{1-y-z}Zr_yHf_z)O_3$.

A Ca ratio w in the composition formula of more than 0.45 leads to a low relative dielectric constant, as in samples 18 and 27. It is therefore preferable that the Ca ratio w satisfy the relationship $0 \leq w \leq 0.45$.

A Ba ratio x of more than 0.05 leads to a high relative dielectric constant, but undesirably increases the dielectric loss and the third-order harmonic distortion rate, as in sample 22. Furthermore, accessory crystal phases are produced, consequently reducing the specific resistance and reliability. If the Ba ratio x is further increased, the third-order harmonic distortion rate is extremely increased, as in sample 21. It is therefore preferable that the Ba ratio x satisfy the relationship $0 \leq x \leq 0.05$.

A sum total of Zr and Hf, that is, y+z, of more than 0.45 leads to a low relative dielectric constant, as in samples 19, 20, and 27. It is therefore preferable that the Zr and Hf total ratio, y+z, satisfy the relationship $0 \leq y+z \leq 0.45$.

An m value of 0.95 or less causes secondary crystal phases to be produced to increase the dielectric loss and reduces the lifetime, as in sample 23. On the other hand, an m value of 1.05 or more not only causes secondary phases to be produced, but also extremely degrades the sintering characteristics of the ceramic, as in sample 24. It is therefore preferable that the m value satisfy the relationship $0.95 < m < 1.05$.

At least one element of Mn, Co, and Ni, being the accessory constituents, has the effects of increasing the sintering characteristics, specific resistance, and mean lifetime of ceramics. However, a total content of less than 0.05 mole of the accessory constituents Mn, Co, and Ni, as in sample 25, does not produce these effects and negatively affects the sintering characteristics to cause accessory crystal phases to be produced. Consequently, the dielectric loss is increased, the specific resistance is reduced; and the mean lifetime is extremely reduced. On the other hand, a Mn, Co, and Ni total content of more than 6.0 moles increases the accessory crystal phases XRD peak intensity ratio to reduce the specific resistance, and reduces the mean lifetime, as in sample 26. It is therefore preferable that the Mn, Co, and Ni total content be in the range of 0.05 to 6.0 moles.

EXPERIMENTAL EXAMPLE 2

Prepared were $SrCO_3$, $CaCO_3$, $BaCO_3$, $ZrO_2$, $TiO_2$ and $HfO_2$ powders with purities of 99% or more as the starting powder materials for the principal constituents, as in Experimental Example 1. Oxide powders of Dy, Ho, Er, Tm, Yb, Lu, Y, and Sc were prepared as a starting material for accessory constituent 1. Also, NiO, $MnCO_3$, and $CoCO_3$ powders were prepared as a starting powder material for accessory constituent 2, as in the accessory constituents in Experimental Example 1.

The starting powder materials for the principal constituents were weighed out so as to constitute the composition expressed by the formula $$(Sr_{1-w-x}Ca_wBa_x)_m(Ti_{1-y-z}Zr_yHf_z)O_3,$$

according to the values of w, x, y, z, and m shown in Table 4. Also, the starting powder materials for accessory constituents 1 and 2 were weighed out so that their mole numbers became the values shown in Table 4 relative to 100 moles of the principal constituents. The weighed starting powder materials were wet-mixed in the same manner as in Experimental Example 1 to prepare an uncalcined powder mixture.

TABLE 4

| Sample number | $(Sr_{1-w-x}Ca_wBa_x)_m(Ti_{1-y-z}Zr_yHf_z)O_3$ 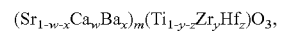 | | | | | Accessory constituent 1 | Accessory constituent 2 | Accessory constituent 1 content (mol) | Accessory constituent 2 content (mol) |
|---|---|---|---|---|---|---|---|---|---|
| | w | x | y | z | m | | | | |
| 28 | 0.00 | 0.00 | 0.00 | 0.00 | 1.00 | Yb | Mn | 2.0 | 2.0 |
| 29 | 0.00 | 0.00 | 0.00 | 0.00 | 1.00 | Dy | Mn | 2.0 | 2.0 |
| 30 | 0.00 | 0.00 | 0.00 | 0.01 | 1.00 | Ho | Mn | 2.0 | 2.0 |
| 31 | 0.00 | 0.00 | 0.00 | 0.00 | 1.00 | Er | Mn | 2.0 | 2.0 |
| 32 | 0.00 | 0.00 | 0.00 | 0.00 | 1.00 | Tm | Mn | 2.0 | 2.0 |
| 33 | 0.00 | 0.00 | 0.00 | 0.00 | 1.00 | Lu | Mn | 2.0 | 2.0 |
| 34 | 0.00 | 0.00 | 0.00 | 0.00 | 1.00 | Y | Mn | 2.0 | 2.0 |
| 35 | 0.00 | 0.00 | 0.00 | 0.00 | 1.00 | Sc | Mn | 2.0 | 2.0 |
| 36 | 0.00 | 0.00 | 0.10 | 0.00 | 1.00 | Yb | Mn | 2.0 | 2.0 |

TABLE 4-continued

| Sample number | $(Sr_{1-w-x}Ca_wBa_x)m(Ti_{1-y-z}Zr_yHf_z)O_3$ | | | | | Accessory constituent 1 | Accessory constituent 2 | Accessory constituent 1 content (mol) | Accessory constituent 2 content (mol) |
|---|---|---|---|---|---|---|---|---|---|
| | w | x | y | z | m | | | | |
| 37 | 0.00 | 0.00 | 0.35 | 0.01 | 1.00 | Yb | Mn | 2.0 | 2.0 |
| 38 | 0.40 | 0.00 | 0.00 | 0.00 | 1.00 | Yb | Mn | 3.0 | 2.0 |
| 39 | 0.10 | 0.00 | 0.10 | 0.00 | 1.04 | Yb | Mn | 0.1 | 2.0 |
| 40 | 0.10 | 0.00 | 0.30 | 0.02 | 0.96 | Yb | Mn | 2.0 | 1.0 |
| 41 | 0.20 | 0.00 | 0.30 | 0.02 | 1.00 | Yb | Mn | 2.0 | 6.0 |
| 42 | 0.10 | 0.05 | 0.25 | 0.00 | 1.00 | Yb | Mn | 4.0 | 5.0 |
| 43 | 0.20 | 0.00 | 0.20 | 0.00 | 1.00 | Yb | Mn | 3.0 | 2.0 |
| 44 | 0.15 | 0.01 | 0.20 | 0.00 | 0.97 | Dy | Mn | 1.5 | 0.5 |
| 45 | 0.30 | 0.03 | 0.30 | 0.01 | 1.04 | Er | Mn | 4.0 | 2.0 |
| 46 | 0.20 | 0.00 | 0.35 | 0.05 | 0.97 | Yb | Co | 0.5 | 1.5 |
| 47 | 0.10 | 0.03 | 0.30 | 0.00 | 0.98 | Y | Ni | 2.0 | 1.5 |
| *48 | 0.00 | 0.00 | 0.35 | 0.01 | 1.00 | Yb | Mn | 2.0 | 2.0 |
| *49 | 0.60 | 0.00 | 0.10 | 0.00 | 1.01 | Yb | Mn | 1.0 | 1.0 |
| *50 | 0.35 | 0.01 | 0.65 | 0.02 | 1.00 | Ho | Mn | 1.5 | 2.0 |
| *51 | 0.15 | 0.00 | 0.10 | 0.00 | 0.85 | Yb | Mn | 1.0 | 2.5 |
| *52 | 0.30 | 0.00 | 0.20 | 0.00 | 1.10 | Yb | Mn | 2.0 | 3.0 |
| *53 | 0.25 | 0.25 | 0.25 | 0.00 | 0.95 | Yb | Mn | 2.5 | 3.0 |
| *54 | 0.10 | 0.00 | 0.35 | 0.01 | 1.00 | Yb | Mn | 7.0 | 2.0 |
| *55 | 0.20 | 0.00 | 0.10 | 0.00 | 1.00 | Dy | Mn | 2.0 | 7.0 |
| *56 | 0.20 | 0.00 | 0.10 | 0.00 | 1.00 | Yb | Co | 2.0 | 7.0 |
| *57 | 0.20 | 0.00 | 0.20 | 0.00 | 1.03 | Yb | — | 4.0 | — |

The samples marked with an asterisk * in Table 4 are outside the scope of the invention, these samples are also marked as well in Tables 5 and 6.

The uncalcined powder mixture was preliminarily calcined at 800° C. for 2 hours in the air to prepare a preliminarily calcined material.

The preliminarily calcined material was mixed and pulverized in a wet ball mill, as in Experimental Example 1. The mean particle size of the resulting preliminarily calcined powder after mixing and pulverization was as small as 0.05 to 0.2 μm.

The mixed and pulverized powder was subjected to main calcination at 1000° C. for 2 hours in the air. The resulting fully calcined material was pulverized to yield a fully calcined powder.

Sample 48 shown in Table 4, which is of a comparative example, has the same composition as Sample 37, but was subjected to only main calcination at 1000° C. for 2 hours with no preliminary calcination.

Each resulting fully calcined powder sample was examined for the particle size, the accessory crystal phases XRD peak intensity ratio, and the crystal system type in the same manner as in Experimental Example 1, and the results are shown in Table 5.

TABLE 5

| Sample number | Fully calcined powder particle size (μm) | Accessory crystal phases XRD peak intensity ratio of fully calcined powder (%) | Crystal system of fully calcined powder | Firing temperature (° C.) | Accessory crystal phases XRD peak intensity ratio of compact (%) | Crystal system of compact |
|---|---|---|---|---|---|---|
| 28 | 0.3 | <1 | Cubic | 1200 | <1 | Cubic |
| 29 | 0.3 | <1 | Cubic | 1200 | <1 | Cubic |
| 30 | 0.3 | <1 | Cubic | 1200 | <1 | Cubic |
| 31 | 0.3 | <1 | Cubic | 1200 | <1 | Cubic |
| 32 | 0.3 | <1 | Cubic | 1200 | <1 | Cubic |
| 33 | 0.3 | <1 | Cubic | 1250 | <1 | Cubic |
| 34 | 0.3 | <1 | Cubic | 1200 | <1 | Cubic |
| 35 | 0.3 | 1 | Cubic | 1300 | <1 | Cubic |
| 36 | 0.3 | <1 | Cubic | 1250 | <1 | Cubic |
| 37 | 0.2 | 2 | Cubic | 1300 | 1 | Cubic |
| 38 | 0.4 | <1 | Cubic | 1200 | <1 | Cubic |
| 39 | 0.2 | 2 | Cubic | 1250 | <1 | Cubic |
| 40 | 0.3 | 1 | Cubic | 1300 | <1 | Cubic |
| 41 | 0.2 | 3 | Cubic | 1300 | 2 | Cubic |
| 42 | 0.3 | <1 | Cubic | 1300 | <1 | Cubic |
| 43 | 0.3 | <1 | Cubic | 1250 | <1 | Cubic |
| 44 | 0.3 | 1 | Cubic | 1300 | <1 | Cubic |
| 45 | 0.2 | 2 | Cubic | 1300 | <1 | Cubic |
| 46 | 0.2 | 2 | Cubic | 1300 | <1 | Cubic |
| 47 | 0.2 | 1 | Cubic | 1250 | <1 | Cubic |
| *48 | 0.2 | 10 | Cubic | 1300 | 6 | Cubic |

TABLE 5-continued

| Sample number | Fully calcined powder particle size (μm) | Accessory crystal phases XRD peak intensity ratio of fully calcined powder (%) | Crystal system of fully calcined powder | Firing temperature (° C.) | Accessory crystal phases XRD peak intensity ratio of compact (%) | Crystal system of compact |
|---|---|---|---|---|---|---|
| * 49 | 0.5 | <1 | Rhombic | 1250 | <1 | Rhombic |
| * 50 | 0.4 | <1 | Rhombic | 1300 | 1 | Rhombic |
| * 51 | 0.3 | 12 | Cubic | 1300 | 8 | Cubic |
| * 52 | 0.2 | 12 | Cubic | 1350 | 7 | Cubic |
| * 53 | 0.2 | 54 | Cubic | 1300 | 65 | Cubic |
| * 54 | 0.2 | 11 | Cubic | 1250 | 9 | Cubic |
| * 55 | 0.3 | 6 | Cubic | 1250 | 7 | Cubic |
| * 56 | 0.4 | 7 | Cubic | 1300 | 7 | Cubic |
| * 57 | 0.1 | 5 | Cubic | 1350 | 7 | Cubic |

To the fully calcined powder were added 1.5 parts by weight of a glass containing $SiO_2$, acting as a sintering agent, relative to 100 parts by weight of all the principal and accessory constituents, a polyvinyl butyral binder, and an organic solvent, such as ethanol. These materials were wet-mixed in a ball mill to prepare a slurry. The resulting ceramic slurry was formed into sheets by a doctor blade technique, thus resulting in rectangular ceramic green sheets with a thickness of about 7 μm.

The ceramic green sheets were layered, pressed, cut, and subjected to the removal of the binder, in the same manner as in Experimental Example 1. Then, the resulting laminate was fired at a firing temperature shown in Table 5 in a reducing atmosphere of $H_2$—$N_2$—$H_2O$ gas to yield a ceramic compact.

The ceramic compact was examined for the crystal system type and the accessory crystal phases XRD peak intensity ratio, in the same manner as in Experimental Example 1, and the results are shown in Table 5.

Meanwhile, monolithic ceramic capacitor samples were prepared using the same ceramic green sheet as in preparation of the foregoing ceramic compact under the same conditions as in Experimental Example 1 except that the internal electrodes were formed of a conductive paste essentially containing Ni.

Each monolithic ceramic capacitor sample was examined for the same properties in the same manner as in Experimental Example 1. The results were shown in Table 6.

TABLE 6

| Sample number | Relative dielectric constant | Dielectric loss (%) | TC (%) | log ρ (Ω · cm) | Mean lifetime (hour) | Third-order harmonic distortion rate (dB) 50 V/mm | Third-order harmonic distortion rate (dB) 200 V/mm |
|---|---|---|---|---|---|---|---|
| 28 | 300 | 0.20 | -16.8 | 12.8 | >100 | -119 | -105 |
| 29 | 303 | 0.25 | -17.3 | 12.3 | 69 | -118 | -107 |
| 30 | 296 | 0.27 | -17.3 | 12.4 | 58 | -115 | -105 |
| 31 | 303 | 0.24 | -17.2 | 12.6 | 77 | -120 | -109 |
| 32 | 299 | 0.21 | -17.1 | 12.6 | 81 | -120 | -108 |
| 33 | 294 | 0.14 | -16.3 | 12.8 | >100 | -119 | -106 |
| 34 | 301 | 0.20 | -17.1 | 12.7 | 66 | -115 | -100 |
| 35 | 298 | 0.19 | -16.9 | 12.5 | 87 | -120 | -107 |
| 36 | 237 | 0.05 | -13.1 | 13.0 | >100 | -120 | -105 |
| 37 | 181 | 0.03 | -9.9 | 13.5 | 93 | <-130 | -111 |
| 38 | 241 | 0.03 | -8.1 | 12.3 | 80 | -123 | -107 |
| 39 | 234 | 0.11 | -11.6 | 12.5 | >100 | -120 | -105 |
| 40 | 179 | 0.02 | -9.7 | 13.5 | >100 | -125 | -109 |
| 41 | 171 | 0.02 | -9.0 | 13.4 | 94 | <-130 | -115 |
| 42 | 190 | 0.08 | -9.5 | 13.5 | >100 | -112 | -102 |
| 43 | 201 | 0.07 | -10.0 | 13.1 | >100 | -118 | -103 |
| 44 | 203 | 0.08 | -9.7 | 13.1 | >100 | -115 | -100 |
| 45 | 176 | 0.01 | -8.2 | 13.3 | >100 | -116 | -104 |
| 46 | 150 | 0.02 | -8.8 | 13.8 | >100 | <-130 | -113 |
| 47 | 182 | 0.01 | -9.4 | 13.2 | >100 | -114 | -102 |
| * 48 | 185 | 0.02 | -9.8 | 13.5 | 26 | -120 | -101 |
| * 49 | 139 | 0.01 | -9.0 | 13.2 | >100 | -121 | -107 |
| * 50 | 95 | 0.01 | -6.8 | 14.1 | >100 | <-130 | -113 |
| * 51 | 228 | 1.24 | -10.8 | 10.9 | 4 | -121 | -107 |
| * 52 | 191 | 1.55 | -8.6 | 11.3 | 13 | -112 | -88 |
| * 53 | 202 | 0.10 | -9.8 | 12.2 | 2 | -93 | -84 |
| * 54 | 210 | 0.66 | -9.7 | 11.1 | 19 | -110 | -94 |
| * 55 | 220 | 0.79 | -11.1 | 11.5 | 9 | -112 | -91 |
| * 56 | 213 | 0.63 | -11.3 | 12.3 | 15 | -114 | -94 |
| * 57 | 200 | 0.92 | -9.0 | 10.7 | <1 | -99 | -91 |

As shown in Table 5, samples 28 to 47 within the scope of the present invention are nonreducing dielectric ceramics each comprising a $SrTiO_3$-based or $(Sr, Ca)(Ti, Zr)O_3$-based perovskite primary crystal phase containing 55 mole percent or more of $SrTiO_3$, and whose powder CuKα X-ray diffraction patterns exhibit a ratio of less than 5% of the maximum peak intensity of the accessory crystal phases to that of the perovskite crystal phase at 2θ=25° to 35°.

The monolithic ceramic capacitors produced from these samples 28 to 47 exhibit a high relative dielectric constant of 150 or more, a low third-order harmonic distortion rate of -110 dB or less at 50 V/mm and -100 dB or less at 200 V/mm, and a long mean lifetime of 50 hours or more.

The reasons will now be explained why the $SrTiO_3$ content in the principal crystal phase of the nonreducing dielectric ceramic of the present invention is controlled and why the maximum peak intensity ratio of the accessory crystal phases to that of the perovskite crystal phase at 2θ=25° to 35° is set at less than 5%.

Samples 49 and 50, whose $SrTiO_3$ content in the principal crystal phase is less than 55 mole percent, exhibit a low relative dielectric constant of 140 or less.

In contrast, samples 28 to 47, whose $SrTiO_3$ content in the principal crystal phase is 55 mole percent or more, have a low Curie temperature of −60° C. or less and no ferroelectricity at room temperature, accordingly exhibiting a low third-order harmonic distortion rate, a relative dielectric constant of 150 or more, and a dielectric loss of 0.30% or less.

Also, an accessory crystal phases XRD peak intensity ratio of 5% or more reduces the mean lifetime, as in samples 48 and 51 to 57. Hence, an accessory crystal phases XRD peak intensity ratio of 5% or more negatively affects the characteristics in a short time.

In contrast, an accessory crystal phases XRD peak intensity ratio of less than 5% leads to a long mean lifetime, as shown in samples 28 to 47, thus resulting in a highly reliable ceramic material. It is therefore preferable that the accessory crystal phases XRD peak intensity ratio be less than 5%.

The fully calcined powder samples whose powder x-ray diffraction pattern shows an accessory crystal phases XRD peak intensity ratio of less than 5% result in sintered compacts exhibiting an accessory crystal phases XRD peak intensity ratio of less than 5%. It is therefore preferable that the proportion of the accessory crystal phases in a calcined powder be low.

The following examines preferred proportions of the composition of the strontium titanate-based nonreducing dielectric ceramic, that is, the composition expressed by the formula $(Sr_{1-w-x}Ca_wBa_x)_m(Ti_{1-y-z}Zr_yHf_z)O_3$.

A Ca ratio w in the composition formula of more than 0.45 leads to a low relative dielectric constant, as in sample 49. It is therefore preferable that the Ca ratio w satisfies the relationship $0 \leq w \leq 0.45$.

A Ba ratio x of more than 0.05 leads to a high relative dielectric constant, but undesirably increases the third-order harmonic distortion rate, as in sample 53. Furthermore, accessory crystal phases are produced, consequently reducing the specific resistance and reliability. It is therefore preferable that the Ba ratio x satisfies the relationship $0 \leq x \leq 0.05$.

A sum total of Zr and Hf, that is, y+z, of more than 0.45 leads to a low relative dielectric constant, as in sample 50. It is therefore preferable that the Zr and Hf total ratio, y+z, satisfy the relationship $0 \leq y+z \leq 0.45$.

An m value of 0.95 or less causes secondary crystal phases to be produced to increase the dielectric loss and reduces the lifetime, as in sample 51. On the other hand, an m value of 1.05 or more not only causes secondary phases to be produced, but also extremely degrades the sintering characteristics of the ceramic, as in sample 52. It is therefore preferable that the m value satisfy the relationship $0.95 < m < 1.05$.

At least one element selected from accessory constituents 1, shown in Table 4, consisting of Dy, Ho, Er, Tm, Yb, Lu, Y, and Sc enhances the stability of the ceramic in a sintering atmosphere, so that a base metal, such as nickel, can be used as the conductive material of the internal electrodes without problems. This effect is achieved when the total content of accessory constituents 1 is set at 0.05 mole or more. However, a total content of accessory constituents 1 of more than 5.0 moles leads to a low specific resistance, as in sample 54. It is therefore preferable that the total content of accessory constituents 1 be in the range of 0.05 to 5.0 moles.

At least one element selected from accessory constituents 2 consisting of Mn, Co, and Ni has the effects of increasing the sintering characteristics, specific resistance, and mean lifetime of the ceramic. However, a total content of accessory constituents 2 of less than 0.05 mole, as in sample 57, does not produce these effects. On the other hand, a total content of accessory constituents 2 of more than 6.0 moles increases the accessory crystal phases XRD peak intensity ratio to reduce the specific resistance, and reduces the mean lifetime, as in samples 55 and 56. It is therefore preferable that the total content of accessory constituents 2 be in the range of 0.05 to 6.0 moles.

EXPERIMENTAL EXAMPLE 3

$SrCO_3$, $CaCO_3$, and $TiO_2$ powders with purities of 99% or more were prepared as the starting powder materials for the principal constituents. Also, $Yb_2O_3$, MnO, $Al_2O_3$, and $MgCO_3$ powders were prepared as the starting powder materials for the accessory constituents. These starting powder materials were each weighed out so that the principal constituents form the composition $(Sr_{0.6}Ca_{0.4})TiO_3$ and that the mole numbers of the accessory constituents in terms of $YbO_{3/2}$, MnO, $AlO_{3/2}$, or $MgCO_3$ became the values shown in Table 7 relative to 100 moles of the principal constituents. The weighed starting powder materials were wet-mixed to prepare an uncalcined powder mixture in the same manner as in Experimental Example 1.

TABLE 7

| Sample number | $YbO_{3/2}$ (mol) | MnO (mol) | $AlO_{3/2}$ (mol) | $MgCO_3$ (mol) |
|---|---|---|---|---|
| 58 | 3.0 | 2.0 | — | — |
| 59 | 3.0 | 0.5 | 2.5 | — |
| 60 | 3.0 | 1.0 | 4.0 | — |
| 61 | 3.0 | 2.0 | 5.5 | — |
| 62 | 3.0 | 0.5 | — | 1.5 |
| 63 | 3.0 | 1.0 | — | 2.5 |
| 64 | 3.0 | 2.0 | — | 4.5 |
| 65 | 3.0 | 0.1 | 1.0 | 1.0 |
| * 66 | 3.0 | 0.5 | 8.0 | — |

Sample 66 marked with an asterisk * in Table 7 is outside the scope of the invention.

The uncalcined powder mixture was preliminarily calcined at 800° C. for 2 hours in the air to prepare a preliminarily calcined material.

After being mixed and pulverized in a wet ball mill, the preliminarily calcined material was subjected to main calcination at 1100° C. for 2 hours in the air. The product was pulverized to yield a fully calcined powder.

The fully calcined powder was examined for the mean particle size and the accessory crystal phases XRD peak intensity ratio in the same manner as in Experimental Example 1. As a result, all of samples 58 to 66 exhibited a mean particle size of 0.4 µm and an accessory crystal phases XRD peak intensity ratio of 1% or less.

To the fully calcined powder were added 1.5 parts by weight of a glass containing $SiO_2$, acting as a sintering agent, relative to 100 parts by weight of all the principal and accessory constituents, a polyvinyl butyral binder, and an organic solvent, such as ethanol. These materials were wet-mixed in a ball mill to prepare a slurry. The resulting ceramic slurry was formed into sheets by a doctor blade technique, thus resulting in rectangular ceramic green sheets with a thickness of about 7 µm.

Then, a ceramic compact and a monolithic ceramic capacitor were prepared from the ceramic green sheets through firing at a firing temperature shown in Table 8, in the same manner as in Experimental Example 1. The resulting ceramic compact and the monolithic ceramic capacitor were examined for the accessory crystal phases XRD peak intensity ratio of the compact, the crystal system type of the compact, the relative dielectric constant, the dielectric loss, TC, log ρ, the mean lifetime, and the third-order harmonic distortion rate, and the results are shown in Table 8.

TABLE 8

| Sample number | Firing temperature (° C.) | Accessory crystal phases XRD peak intensity ratio of compact (%) | Crystal system of compact | Relative dielectric constant | Dielectric loss (%) | TC (%) | log ρ (Ω · cm) | Mean lifetime (hour) | Third-order harmonic distortion rate (dB) 50 V/mm | Third-order harmonic distortion rate (dB) 200 V/mm |
|---|---|---|---|---|---|---|---|---|---|---|
| 58 | 1200 | <1 | Cubic | 241 | 0.03 | −8.1 | 12.3 | 80 | −123 | −107 |
| 59 | 1200 | 1 | Cubic | 222 | 0.05 | −8.1 | 14.1 | >100 | −125 | −109 |
| 60 | 1200 | 1 | Cubic | 219 | 0.02 | −8.1 | 14.5 | >100 | −120 | −106 |
| 61 | 1250 | 1 | Cubic | 208 | 0.08 | −8.0 | 13.7 | 84 | −124 | −115 |
| 62 | 1300 | <1 | Cubic | 224 | 0.02 | −8.3 | 13.7 | >100 | −121 | −107 |
| 63 | 1300 | <1 | Cubic | 226 | 0.03 | −8.3 | 13.6 | >100 | −121 | −112 |
| 64 | 1300 | 2 | Cubic | 207 | 0.10 | −8.1 | 13.2 | 65 | −119 | −108 |
| 65 | 1250 | <1 | Cubic | 229 | 0.08 | −8.4 | 13.9 | >100 | −120 | −110 |
| * 66 | 1250 | 5 | Cubic | 224 | 0.12 | −8.0 | 13.8 | 35 | −115 | −98 |

Tables 7 and 8 show that samples 58 to 65 of the present invention achieve a high relative dielectric constant of 150 or more, a low third-order harmonic distortion rate of −110 dB or less at 50 V/mm and −100 dB or less at 200 V/mm, and a long mean lifetime of 50 hours or more.

In addition, samples 59 to 65, which contain at least one of Al and Mg, exhibit a specific resistance higher than that of sample 58, which does not contain these elements.

However, an Al and Mg total content of more than 6.0 moles causes accessory crystal phases to be produced to increase their XRD peak intensity ratio to 5% or more and reduces the mean lifetime, as in sample 66.

It is therefore preferable that the Al and Mg total content be 6.0 moles or less relative to 100 moles of the principal constituents.

EXPERIMENTAL EXAMPLE 4

Prepared were $SrCO_3$, $CaCO_3$, $ZrO_2$, and $TiO_2$ powders with purities of 99% or more as the starting powder materials for the principal constituents. Also, $Yb_2O_3$ and $MgCO_3$ powders were prepared as the starting powder materials for the accessory constituents.

These starting powder materials were each weighed out so that the principal constituents form the composition $(Sr_{0.8}Ca_{0.2})(Ti_{0.8}Zr_{0.2})O_3$ and that the mole numbers of the accessory constituents $Yb_2O_3$ and $MgCO_3$ in terms of $YbO_{3/2}$ or $MgCO_3$ each became 3.0 moles relative to 100 moles of the principal constituents. The weighed starting powder materials were wet-mixed to prepare an uncalcined powder mixture in the same manner as in Experimental Example 1.

The uncalcined powder mixture was preliminarily calcined at 800° C. for 2 hours in the air to prepare a preliminarily calcined material.

After being mixed and pulverized in a wet ball mill, the preliminarily calcined material was subjected to main calcination at 1100° C. for 2 hours in the air. The product was pulverized to yield a fully calcined powder.

The fully calcined powder was examined for the mean particle size and the accessory crystal phases XRD peak intensity ratio in the same manner as in Experimental Example 1. As a result, the mean particle size was 0.3 μm and the accessory crystal phases XRD peak intensity ratio was 1% or less.

An amount shown in Table 9 of a sintering agent shown in Table 9 was added to the fully calcined powder relative to 100 parts by weight of all the principal and accessory constituents, and, further, a polyvinyl butyral binder and an organic solvent, such as ethanol, were added. These materials were wet-mixed in a ball mill to prepare a slurry. The resulting ceramic slurry was formed into sheets by a doctor blade technique, thus resulting in rectangular ceramic green sheets with a thickness of about 7 μm.

TABLE 9

| Sample number | Sintering agent (molar ratio) | Content (part by weight) |
|---|---|---|
| 67 | None | — |
| 68 | $SiO_2$ | 5 |
| 69 | $0.25Li_2O$—$0.65(0.30Si•0.70Ti)O_2$—$0.10Al_2O_3$ | 1 |
| 70 | $0.66SiO_2$—$0.17TiO_2$—$0.15BaO$—$0.02MnO$ | 0.1 |
| 71 | $0.45SiO_2$—$0.22TiO_2$—$0.28BaO$—$0.05Al_2O_3$ | 10 |
| 72 | $0.35Li_2O$—$0.50B_2O_3$—$0.15(0.90Si•0.10Ti)O_2$ | 3 |
| 73 | $0.35Li_2O$—$0.15B_2O_3$—$0.45(0.30Si•0.70Ti)O_2$—$0.05ZrO_2$ | 6 |
| 74 | $0.70B_2O_3$—$0.15Al_2O_3$—$0.10BaO$—$0.03ZnO$—$0.02MnO$ | 20 |
| 75 | $0.35Li_2O$—$0.50B_2O_3$—$0.15(0.90Si•0.10Ti)O_2$ | 8 |
| * 76 | $0.25Li_2O$—$0.65(0.30Si•0.70Ti)O_2$—$0.10Al_2O_3$ | 25 |

Sample 76 marked with an asterisk * in Table 9 is outside the scope of the invention.

A ceramic compact and a monolithic ceramic capacitor were prepared from the ceramic green sheets through firing at a firing temperature shown in Table 10, in the same manner as in Experimental Example 1.

The resulting ceramic compact and the monolithic ceramic capacitor were examined for the accessory crystal phases XRD peak intensity ratio of the compact, the crystal system type of the compact, the relative dielectric constant, the dielectric loss, TC, log ρ, the mean lifetime, and the third-order harmonic distortion rate, and the results are shown in Table 10.

TABLE 10

| Sample number | Firing temperature (° C.) | Accessory crystal phases XRD peak intensity ratio of compact (%) | Crystal system of compact | Relative dielectric constant | Dielectric loss (%) | TC (%) | log ρ (Ω · cm) | Mean lifetime (hour) | Third-order harmonic distortion rate (dB) | |
|---|---|---|---|---|---|---|---|---|---|---|
| | | | | | | | | | 50 V/mm | 200 V/mm |
| 67 | 1350 | <1 | Cubic | 202 | 0.03 | −10.0 | 13.0 | >100 | −118 | −108 |
| 68 | 1200 | <1 | Cubic | 189 | 0.03 | −9.8 | 13.2 | >100 | −119 | −107 |
| 69 | 1250 | <1 | Cubic | 201 | 0.07 | −10.0 | 13.1 | >100 | −118 | −103 |
| 70 | 1250 | <1 | Cubic | 205 | 0.05 | −9.9 | 13.5 | >100 | −121 | −105 |
| 71 | 1150 | 2 | Cubic | 175 | 0.10 | −9.4 | 13.1 | 91 | −116 | −103 |
| 72 | 1100 | <1 | Cubic | 192 | 0.03 | −9.7 | 13.2 | >100 | −122 | −110 |
| 73 | 1100 | <1 | Cubic | 183 | 0.08 | −9.6 | 13.0 | >100 | −119 | −104 |
| 74 | 1100 | 3 | Cubic | 159 | 0.15 | −9.0 | 12.7 | 74 | −115 | −102 |
| 75 | 1100 | <1 | Cubic | 177 | 0.07 | −9.6 | 13.3 | >100 | −116 | −102 |
| *76 | 1200 | 6 | Cubic | 145 | 0.21 | −8.6 | 12.7 | 31 | −118 | −103 |

Table 10 shows that samples 67 to 75 of the present invention achieve a high relative dielectric constant of 150 or more, a low third-order harmonic distortion rate of −110 dB or less at 50 V/mm and −100 dB or less at 200 V/mm, and a long mean lifetime of 50 hours or more.

Also, samples 68 to 76, which contain a sintering agent as shown in Table 9, can be sintered at a temperature 100° C. or more lower than the sintering temperature of sample 67, which contains no sintering agent, as shown in the "sintering temperature" columns in Table 10.

However, a sintering agent content of more than 20 parts by weight to 100 parts by weight of all the principal constituents and the accessory constituents increases the accessory phases XRD peak intensity ratio to 5% or more and reduces the mean lifetime to 50 hours or less, as in sample 76.

It is therefore preferable that the sintering agent content is 20 parts by weight or less to 100 parts by weight of all the constituents of the principal constituents and the accessory constituents.

INDUSTRIAL APPLICABILITY

The nonreducing dielectric ceramic of the present invention can advantageously be used not only for temperature compensating capacitors and low-loss capacitors, but also as microwave dielectric resonators, and, thus, has large value in industrial use.

The invention claimed is:

1. A nonreducing dielectric ceramic comprising a perovskite principal crystal phase containing 55 mole percent or more of $SrTiO_3$ and an accessory crystal phase containing all the crystal phases other than the perovskite crystal phase, wherein the ratio of the accessory crystal phase powder CuKα X-ray diffraction pattern maximum peak intensity at $2\theta = 25°$ to 35° to that of the perovskite crystal phase is less than 5%.

2. A nonreducing dielectric ceramic according to claim 1, wherein the perovskite principal crystal phase comprises a (Sr, Ca)(Ti, Zr)$O_3$ perovskite.

3. A nonreducing dielectric ceramic according to claim 1, wherein the principal constituent of the ceramic is a composition expressed by the formula

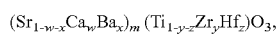

$(Sr_{1-w-x}Ca_wBa_x)_m(Ti_{1-y-z}Zr_yHf_z)O_3$, where w, x, y, z, and m satisfy the expressions:

$0 \leq w \leq 0.45$;

$0 \leq x \leq 0.05$;

$0 \leq w+x \leq 0.45$;

$0 \leq y+z \leq 0.45$; and $0.95 < m < 1.05$, and the ceramic contains an accessory constituent comprising at least one element selected from the group consisting of Mn, Ni and Co, in which the total content thereof in terms of MnO, NiO and CoO is in the range of 0.05 to 6.0 moles relative to 100 moles of the principal constituent.

4. A nonreducing dielectric ceramic according to claim 3, wherein the accessory constituent contains Re, wherein Re is at least one element selected from the group consisting of Dy, Ho, Er, Tm, Yb, Lu, Y and Sc.

5. A nonreducing dielectric ceramic according to claim 4, wherein the total content of Re, in terms of $DyO_{3/2}$, $HoO_{3/2}$, $ErO_{3/2}$, $TmO_{3/2}$, $YbO_{3/2}$, $LuO_{3/2}$, $YO_{3/2}$, or $ScO_{3/2}$ is in the range of 0.05 to 5.0 moles relative to 100 moles of the principal constituent.

6. A nonreducing dielectric ceramic according to claim 5, wherein the accessory constituent comprises at least one of an aluminum compound and a magnesium compound, and the total content thereof in terms of $AlO_{3/2}$ or MgO is 6.0 moles or less relative to 100 moles of the principal constituent.

7. A nonreducing dielectric ceramic according to claim 6, comprising a sintering agent containing at least one of Si and B.

8. A nonreducing dielectric ceramic according to claim 7, wherein the sintering agent content is 20 parts by weight or less relative to 100 parts by weight of the principal constituent and the accessory constituent.

9. A nonreducing dielectric ceramic according to claim 3, wherein the accessory constituent comprises at least one of an aluminum compound and a magnesium compound, and the total content thereof in terms of $AlO_{3/2}$ or MgO is 6.0 moles or less relative to 100 moles of the principal constituent.

10. A nonreducing dielectric ceramic according to claim 3, comprising a sintering agent containing at least one of Si and B.

11. A nonreducing dielectric ceramic according to claim 10, wherein the sintering agent content is 20 parts by weight or less relative to 100 parts by weight of the principal constituent and the accessory constituent.

12. A nonreducing dielectric ceramic according to claim 1, comprising an accessory constituent containing Re, wherein Re is at least one element selected from the group consisting of Dy, Ho, Er, Tm, Yb, Lu, Y and Sc.

13. A nonreducing dielectric ceramic according to claim 1, comprising an accessory constituent which comprises at least one of an aluminum compound and a magnesium compound.

14. A nonreducing dielectric ceramic according to claim 1, comprising an accessory constituent comprising at least one element selected from the group consisting of Mn, Ni and Co.

15. A nonreducing dielectric ceramic according to claim 1, comprising a sintering agent containing at least one of Si and B.

16. A method for manufacturing the nonreducing dielectric ceramic of claim 1, comprising providing a mixture comprising a plurality of starting materials containing elements constituting a composition expressed by $(Sr_{1-w-x}Ca_wBa_x)_m(Ti_{1-y-z}Zr_yHf_z)O_3$, where $0 \leq w \leq 0.45$, $0 \leq x \leq 0.05$, $0 \leq w+x \leq 0.45$, $0 \leq y+z \leq 0.45$, and $0.95 < m < 1.05$;

conducting a preliminary calcination of the mixture of the starting materials;

pulverizing the preliminarily calcined mixture;

fully calcining the pulverized preliminarily calcined mixture at a temperature higher than the temperature of the preliminary calcination; and sintering the fully calcined material.

17. A method for manufacturing a nonreducing dielectric ceramic according to claim 16, wherein the preliminarily calcining is at a temperature in the range of 500 to 1,000° C. and the fully calcining is at a temperature in the range of 800 to 1,200° C.

18. A method for manufacturing a nonreducing dielectric ceramic according to claim 16, wherein at least one of w, x, y and z is 0.

19. A monolithic ceramic capacitor comprising: a plurality of dielectric ceramic layers; a plurality of internal electrodes comprising a base metal as a conductive constituent and separated from each other by dielectric ceramic, and two external electrodes, each electrically connected to different internal electrodes, wherein the dielectric ceramic layers comprise a nonreducing dielectric ceramic according to claim 1.

20. A monolithic ceramic capacitor according to claim 14, wherein the base metal is nickel, a nickel alloy, copper or a copper alloy.

* * * * *